(12) United States Patent
Toya et al.

(10) Patent No.: US 10,027,153 B2
(45) Date of Patent: Jul. 17, 2018

(54) INFORMATION DISPLAYING METHOD AND INFORMATION DISPLAYING DEVICE

(71) Applicant: Panasonic Intellectual Property Management Co., Ltd., Osaka (JP)

(72) Inventors: Shoichi Toya, Hyogo (JP); Kazuki Funase, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 267 days.

(21) Appl. No.: 14/836,933

(22) Filed: Aug. 26, 2015

(65) Prior Publication Data
US 2015/0372518 A1 Dec. 24, 2015

Related U.S. Application Data

(63) Continuation of application No. PCT/JP2015/000274, filed on Jan. 22, 2015.

(30) Foreign Application Priority Data

Jan. 31, 2014 (JP) ................. 2014-017563

(51) Int. Cl.
*H02J 7/00* (2006.01)
*H02J 7/14* (2006.01)
(Continued)

(52) U.S. Cl.
CPC .......... *H02J 7/0047* (2013.01); *G06F 3/0482* (2013.01); *G06F 3/0488* (2013.01);
(Continued)

(58) Field of Classification Search
USPC ....... 320/106, 107, 134, 137, 108, 132, 162, 320/101, 109, 115, 118, 148, 160, 104,
(Continued)

(56) References Cited

U.S. PATENT DOCUMENTS

2005/0248311 A1* 11/2005 Komaki .................... G06F 1/28
320/112
2008/0150477 A1* 6/2008 Nakashima ........ G01R 31/3682
320/107

(Continued)

FOREIGN PATENT DOCUMENTS

| JP | 2005-198445 | 7/2005 |
|----|-------------|--------|
| JP | 2005-321983 | 11/2005 |

(Continued)

OTHER PUBLICATIONS

International Search Report of PCT application No. PCT/JP2015/000274 dated Feb. 24, 2015.

*Primary Examiner* — Alexis Pacheco
(74) *Attorney, Agent, or Firm* — Greenblum & Bernstein, P.L.C.

(57) ABSTRACT

An information displaying method includes acquiring a battery identifier to identify a battery pack associated with a display device and a device identifier to identify a device to which the battery pack has been mounted, and causing a monitor of the display device to display information indicating that the battery pack corresponding to the acquired battery identifier has been mounted to the device corresponding to the acquired device identifier.

15 Claims, 28 Drawing Sheets

(51) Int. Cl.
*H02J 13/00* (2006.01)
*G06F 3/0488* (2013.01)
*G06F 3/0482* (2013.01)
*G06F 3/0481* (2013.01)
*H01M 10/42* (2006.01)

(52) U.S. Cl.
CPC ........ *G06F 3/04817* (2013.01); *H02J 7/0021* (2013.01); *H02J 7/0045* (2013.01); *H02J 13/001* (2013.01); *H01M 2010/4278* (2013.01); *H02J 2007/005* (2013.01); *H02J 2007/0096* (2013.01); *Y04S 10/40* (2013.01)

(58) Field of Classification Search
USPC .................... 320/110, 125, 103, 114, 116
See application file for complete search history.

(56) References Cited

U.S. PATENT DOCUMENTS

| | | | | |
|---|---|---|---|---|
| 2009/0121687 | A1* | 5/2009 | Kobayashi | H01M 10/44 320/162 |
| 2011/0202219 | A1* | 8/2011 | Ishibashi | B60L 11/1809 701/22 |
| 2013/0030991 | A1* | 1/2013 | Neidlinger | G07F 15/006 705/39 |
| 2013/0082652 | A1* | 4/2013 | Jung | H02J 7/0013 320/108 |
| 2013/0297841 | A1* | 11/2013 | Bhesania | G05F 1/70 710/105 |
| 2013/0300356 | A1* | 11/2013 | Yang | H02J 7/0047 320/108 |
| 2014/0111147 | A1* | 4/2014 | Soar | H01F 27/365 320/108 |
| 2014/0132205 | A1* | 5/2014 | Paczkowski | H02J 7/0042 320/107 |
| 2015/0028813 | A1* | 1/2015 | Alobaidi | H02J 7/0042 320/110 |
| 2015/0091498 | A1* | 4/2015 | Abdelmoneum | H02J 7/025 320/107 |
| 2015/0097525 | A1* | 4/2015 | DeDona | B60L 11/1838 320/109 |

FOREIGN PATENT DOCUMENTS

| | | |
|---|---|---|
| JP | 2011-096233 | 5/2011 |
| JP | 2011-203595 | 10/2011 |
| JP | 2013-200821 | 10/2013 |

* cited by examiner

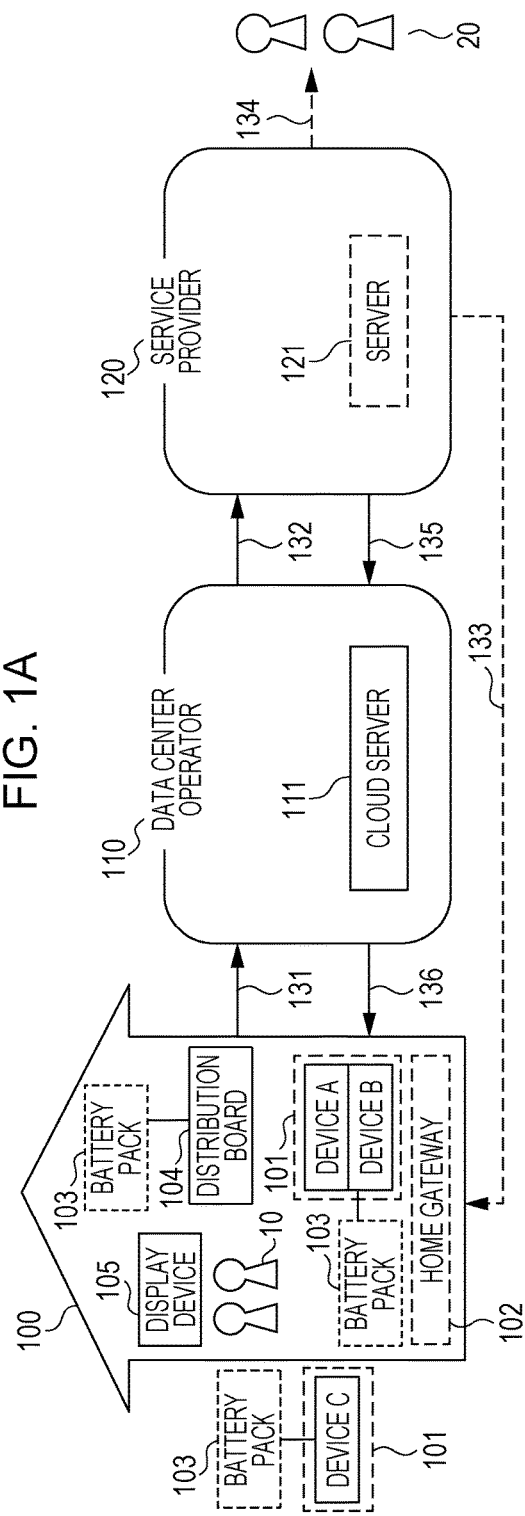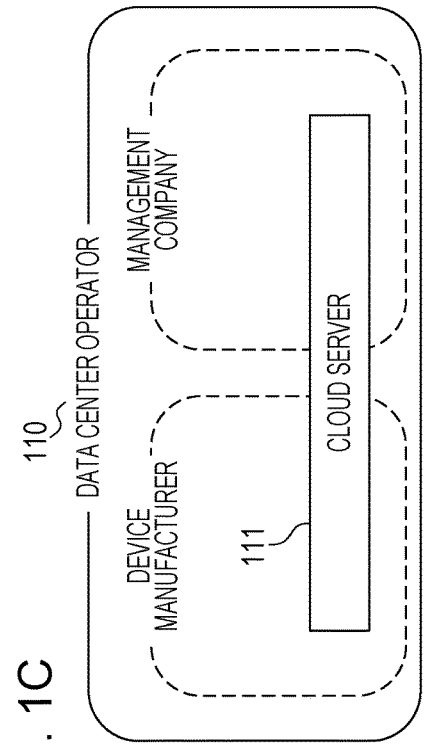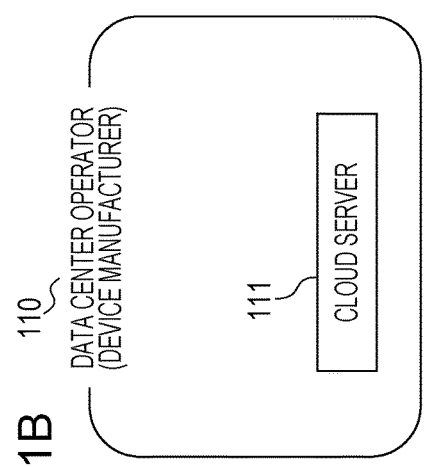

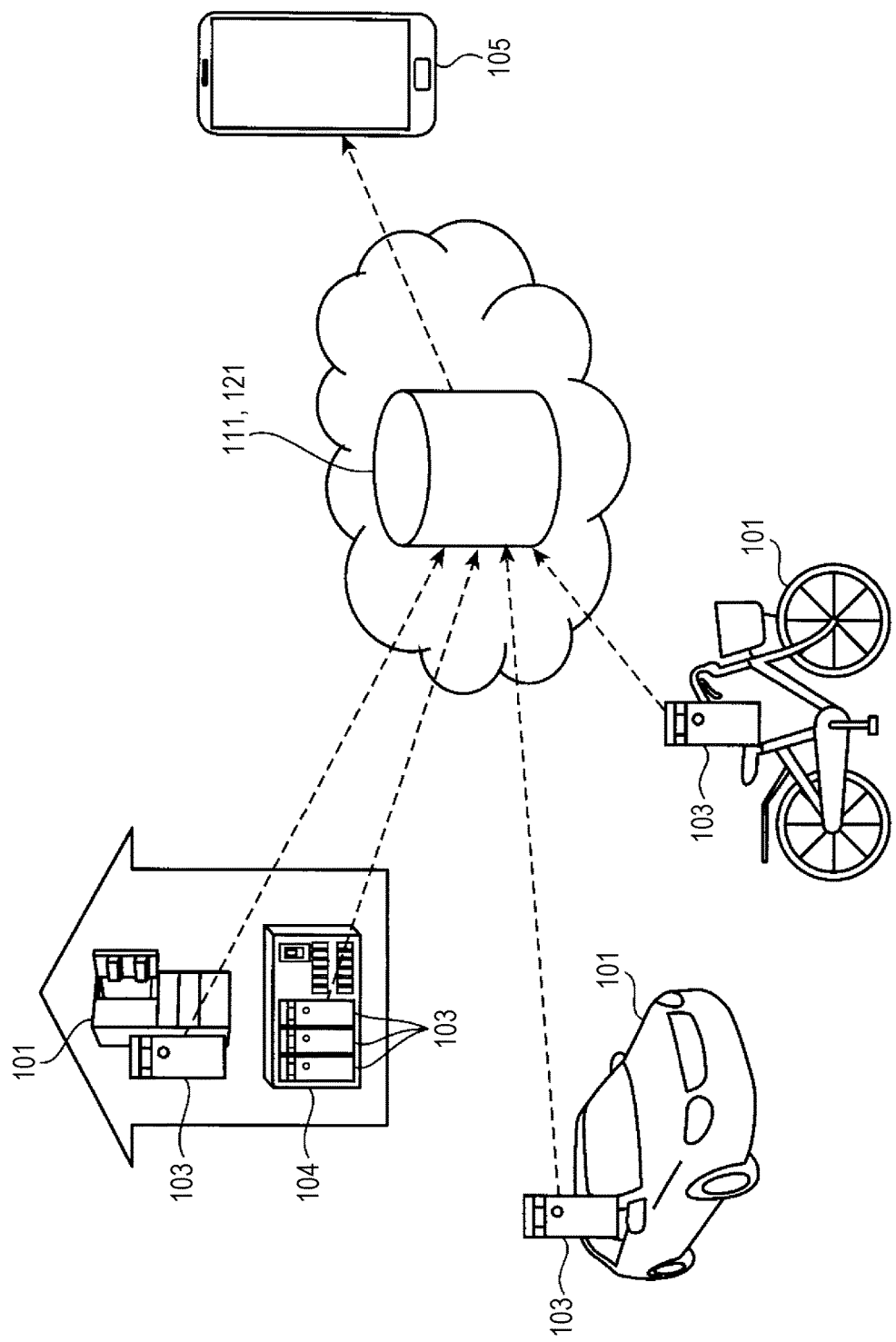

FIG. 5

| USER HOUSEHOLD ID | BATTERY PACK ID | DEVICE ID | MOUNTED STATE | DATE AND TIME |
|---|---|---|---|---|
| 0XX168 | 1 | XX01 | MOUNTED | 12172013 10:58 |
|  | 3 | AA01 | MOUNTED | 12172013 11:28 |
|  | 1 | XX01 | DETACHED | 12172013 11:50 |
|  | 3 | XX02 | DETACHED | 12172013 17:58 |
| 0XX169 | ... | ... | ... | ... |

FIG. 22

| USER HOUSEHOLD ID | USER INDIVIDUAL ID | BATTERY PACK ID | DEVICE ID | MOUNTED STATE | DATE AND TIME |
|---|---|---|---|---|---|
| 0XX168 | A | 1 | XX01 | MOUNTED | 12172013 10:58 |
| | B | 3 | AA01 | MOUNTED | 12172013 11:28 |
| | A | 1 | XX01 | DETACHED | 12172013 11:50 |
| | B | 3 | XX02 | DETACHED | 12172013 17:58 |
| 0XX169 | ... | ... | ... | ... | ... |

INFORMATION DISPLAYING METHOD AND INFORMATION DISPLAYING DEVICE

BACKGROUND

1. Technical Field

The present disclosure relates to an information displaying method, an information displaying device that display information at a monitor of a display device regarding a mounted state of a battery pack mountable to a device, and the battery pack mountable to a device.

2. Description of the Related Art

Conventionally, there are known electronic devices which detect mounting of a battery pack, detect information relating to trouble in the battery pack regarding which mounting has been detected, performing determination regarding trouble of the battery pack based on the detected information, and display warning screen information relating to a battery pack regarding which determination has been made that there is trouble (e.g., see Japanese Unexamined Patent Application Publication No. 2005-321983). The electronic device in Japanese Unexamined Patent Application Publication No. 2005-321983 can notify the user of information such as life expectancy of the battery pack, trouble, and so forth, and can restrict unnecessary charging, activation, and so forth. However, assuming cases where battery packs are mounted to various types of home appliances, there has been room for improvement with the above-described related art.

SUMMARY

One non-limiting and exemplary embodiment provides an information providing method, information providing, and battery pack, whereby the user can comprehend the device to which a battery pack has been mounted.

In one general aspect, the techniques disclosed here feature an information displaying method includes acquiring a battery identifier to identify a battery pack associated with a display device and a device identifier to identify a device to which the battery pack has been mounted, and causing a monitor of the display device to display information indicating that the battery pack corresponding to the acquired battery identifier has been mounted to the device corresponding to the acquired device identifier.

According to the present disclosure, which device a battery pack has been mounted to is notified to a display device, so the user can comprehend the device to which the battery pack has been mounted.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A is a diagram illustrating an overall image of service provided by a control system according to an embodiment;

FIG. 1B is a diagram illustrating an example where a device manufacturer a data center operator;

FIG. 1C is a diagram illustrating an example where both or one of the device manufacturer and management company is the data center operator;

FIG. 2 is a diagram illustrating a schematic configuration of an information providing system according to a first embodiment of the present disclosure;

FIG. 5 is a diagram illustrating an example of data stored in a battery pack management database according to the first embodiment;

FIG. 22 is a diagram illustrating an example of data stored in a battery pack management database according to the third embodiment;

DETAILED DESCRIPTION

Figure 3:
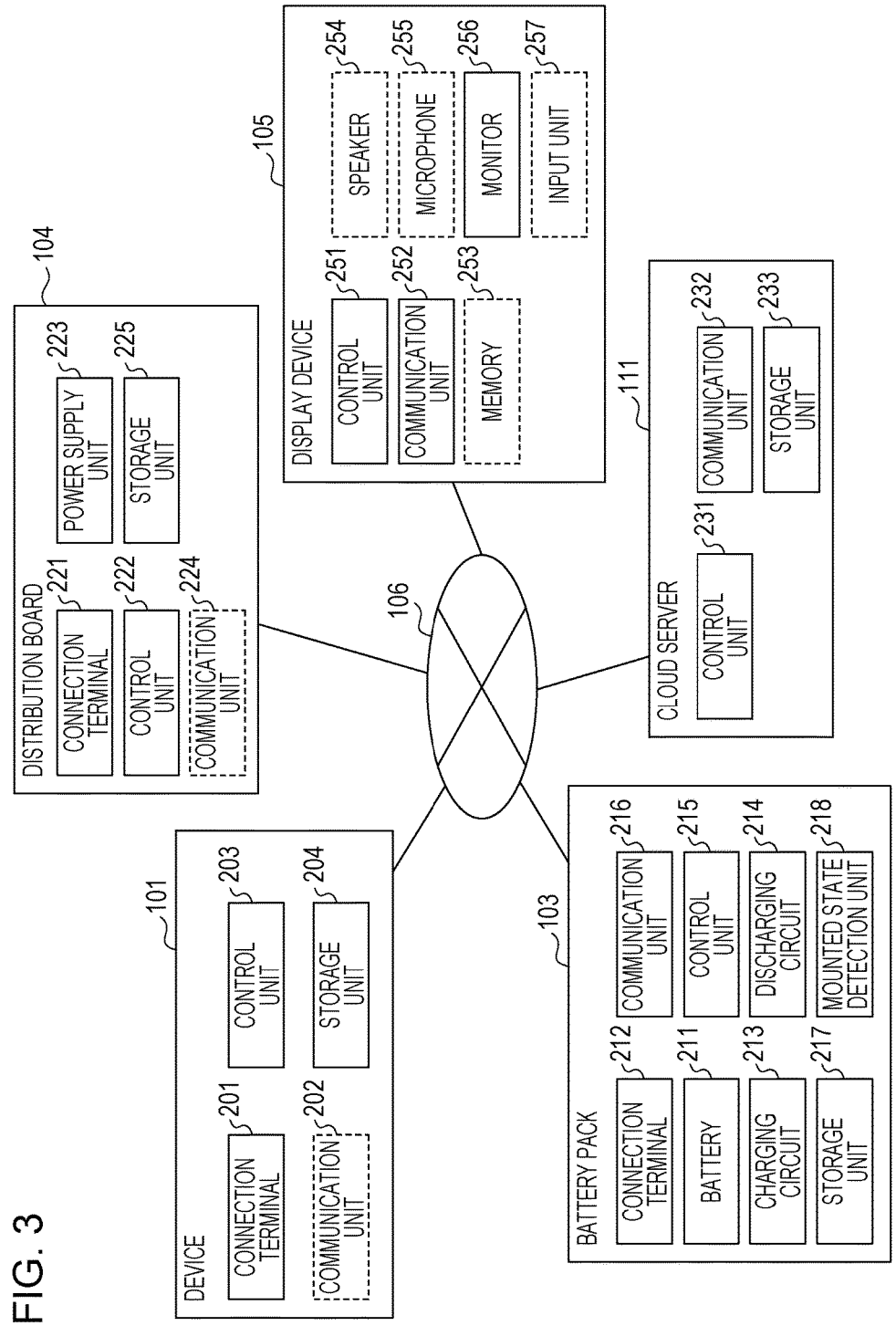
FIG. 3 is a diagram illustrating the hardware configuration of the information providing system according to the first embodiment of the present disclosure.

Underlying Knowledge Forming Basis of the Present Disclosure

In Japanese Unexamined Patent Application Publication No. 2005-321983, an electronic device detects mounting of a battery pack, detects information relating to trouble in the battery pack regarding which mounting has been detected, performs determination regarding trouble of the battery pack based on the detected information, and displays warning screen information relating to a battery pack regarding which determination has been made that there is trouble. The warning screen information is displayed on a display provided to the electronic device.

The above-described related art does not take into consideration a situation where battery backs are mounted to various home appliances within the home, and multiple users share the multiple battery packs, so it is difficult to readily comprehend which battery pack is mounted to which home appliance.

While the state of a battery back mounted to an electronic device can be confirmed with the related art, confirming the state of another battery pack mounted to another electronic device is difficult, so it is difficult to readily comprehend the state of multiple battery packs. The present inventors have reached the findings according to the following forms to solve such problems.

According to an aspect of the present disclosure, an information displaying method to display information at a monitor of a display device regarding a mounted state of a battery pack detachably mountable to a device. The method includes acquiring a battery identifier to identify a battery pack associated with a display device and a device identifier to identify a device to which the battery pack has been mounted, and causing a monitor of the display device to display information indicating that the battery pack corresponding to the acquired battery identifier has been mounted to the device corresponding to the acquired device identifier.

In this case, the battery identifier to identify the battery pack associated with a display device and the device identifier to identify the device to which the battery pack has been mounted are acquired. Information indicating that the battery pack corresponding to the acquired battery identifier has been mounted to the device corresponding to the acquired device identifier is then displayed at the monitor of the display device.

Accordingly, which device the battery pack has been mounted to is notified to the display device, so the user can comprehend the device to which the battery pack has been mounted.

Now, associating the battery pack and display device is performed by associating a battery identifier and display device, for example, but is not restricted to this. Any method may be used as long as the battery pack and display device are associated.

The information displaying method may further include acquiring a battery identifier to identify the battery pack and a device identifier to identify the device to which the battery pack has been mounted, upon the battery pack being mounted to the device, and causing a monitor of a display device associated with the battery pack to display information indicating that the battery pack corresponding to the acquired battery identifier has been mounted to the device corresponding to the acquired device identifier.

Now, acquisition of the device identifier is performed by acquiring to a storage unit of a server device via a storage unit of the battery pack, but is not restricted to this. That is to say, an arrangement may be made where acquisition is performed only to the storage unit of the battery pack. It is sufficient that acquisition of the device identifier be performed by the at least the storage unit of the battery pack acquiring the device identifier when the battery pack is mounted to the device; the timing at which the storage device of the server acquires the device identifier is optional as long as after the storage device of the battery pack has acquired the device identifier.

The battery pack may be connectable to a plurality of devices. In this case, the display device is notified of which battery pack of the multiple battery packs has been mounted to which device of the multiple devices, so the user can comprehend the device to which the battery pack has been mounted out of the multiple devices.

The plurality of devices may include a plurality of devices of different types. In this case, the battery pack can be mounted to multiple devices of different types, and the user can comprehend which device of the multiple different types of devices the battery pack has been mounted to.

The information displaying method may further include, upon a battery pack being mounted to a device, causing a monitor of a display device associated with the battery pack to display information indicating that the battery pack corresponding to the acquired battery identifier has been mounted to the device corresponding to the acquired device identifier.

In this case, in a case of a battery pack being mounted to a device, the user can comprehend the device to which the battery pack has been mounted.

In the information displaying method, the battery identifier to identify the battery pack associated with the display device and the device identifier to identify the device to which the battery pack has been mounted may be acquired upon accepting a request to display the amounted state of the battery pack associated with the display device on the display device. Information indicating that the battery pack corresponding to the acquired battery identifier has been mounted to the device corresponding to the acquired device identifier may be displayed at the monitor of the display device.

In this case, in a case of having accepted a request to display the mounted state of the battery pack associated with the display device, the user can comprehend the device to which the battery pack has been mounted.

In the information displaying method, a second image indicating a mounted state of the battery pack may be displayed in the perimeter of a first image indicating the device to which the battery pack has been mounted.

In this case, the second image indicating the mounted state of the battery pack is displayed in the perimeter of the first image indicating the device to which the battery pack has been mounted, so the user can easily confirm to which devices battery packs have been mounted.

In the information displaying method, a second image indicating a mounted state of the battery pack may be displayed superimposed on a first image indicating the device to which the battery pack has been mounted.

In this case, the second image indicating the mounted state of the battery pack is displayed superimposed on the first image indicating the device to which the battery pack has been mounted, so the user can easily confirm to which devices battery packs have been mounted.

The information displaying method may further include: acquiring, when the display device accepts an input operation from a user to cause the monitor to display a mounted state of a battery pack to a certain device out of the plurality of devices, information relating to the number of battery packs mountable to the certain device and the mounted state of the battery pack; and causing the monitor to display, in an identifiable manner, based on the acquired information, the number of battery packs mountable to the certain device, and also to display a state in which the battery pack is mounted and a state in which the battery pack is not mounted in mutually different display forms. The battery pack may be connectable to a plurality of devices.

In this case, the battery pack is connectable to a plurality of devices. Upon accepting the input operation from the user to cause the monitor to display the mounted state of the battery pack to the certain device out of the plurality of devices, information relating to the number of battery packs mountable to the certain device and the mounted state of the battery pack is acquired. Based on the acquired information, the number of battery packs mountable to the certain device is displayed in the identifiable manner, and also the state in which the battery pack is mounted and the state in which the battery pack is not mounted are displayed in mutually different display forms. Accordingly, in a case of having accepted the input operation from the user to cause the monitor to display the mounted state of the battery pack of the certain device out of multiple devices, the user can easily confirm whether or not the battery pack has been mounted to the certain device.

In the information displaying method, battery identifiers of all battery packs mounted to the certain device, and the remaining charge in the batteries of each of the battery packs may be further acquired upon accepting the input operation request from the user. In this case, information to identify the battery packs corresponding to the acquired battery identifiers, and the remaining charge of the battery packs corresponding to the acquired battery identifiers are displayed together.

In this case, upon accepting the input operation from the use to cause the monitor to display the mounted state of the battery pack to the certain device out of the plurality of devices, battery identifiers of all battery packs mounted to the certain device, and the remaining charge in the batteries of each of the battery packs, are acquired. Information to identify the battery packs corresponding to the acquired battery identifiers, and the remaining charge of the battery packs corresponding to the acquired battery identifiers, are then displayed together. Accordingly, in a case of having accepted the input operation from the user to cause the monitor to display the mounted state of the battery pack of the certain device out of multiple devices, the user can easily comprehend all battery packs mounted to the certain device, and the remaining charge of the batteries of each of the battery packs.

The information displaying method may further include: acquiring, upon accepting an input operation from a user to cause the monitor to display mounted states of battery packs to a plurality of devices which a certain household has, information relating to the number of battery packs mountable to all devices which the certain household has and the mounted state of each battery pack; and causing the monitor to display, in an identifiable manner, based on the acquired information, the number of battery packs mountable to all devices which the certain household has, and also to display a state in which a battery pack is mounted and a state in which a battery pack is not mounted in mutually different display forms.

In this case, upon accepting the input operation from the user to cause the monitor to display mounted states of battery packs to a plurality of devices which the certain household has, information relating to the number of battery packs mountable to all devices which the certain household has and the mounted state of each battery pack is acquired. Based on the acquired information, the number of battery packs mountable to all devices which the certain household has may be displayed in the identifiable manner, and also the state in which a battery pack is mounted and the state in which the battery pack is not mounted are displayed in mutually different display forms.

Accordingly, in a case of accepting the input operation from the user to cause the monitor to display mounted states of battery packs to a plurality of devices which the certain household has, the user can easily comprehend the number of battery packs mountable to all devices which the certain household has, and whether or not battery packs are mounted to each of all of the devices which the certain household has.

In the information displaying method, battery identifiers of all battery packs mounted to each of all devices which the certain household has, and the remaining charge in the batteries of each of the battery packs may be further acquired upon accepting the input operation from the user to cause the monitor to display mounted states of battery packs to a plurality of devices which the certain household has. Information to identify the battery packs corresponding to the acquired battery identifiers, and the remaining charge of the battery packs corresponding to the acquired battery identifiers may be displayed together at the monitor.

In this case, upon accepting the input operation from the user to cause the monitor to display mounted states of battery packs to a plurality of devices which the certain household has, battery identifiers of all battery packs mounted to each of all devices which the certain household has, and the remaining charge in the batteries of each of the battery packs, are acquired. Information to identify the battery packs corresponding to the acquired battery identifiers, and the remaining charge of the battery packs corresponding to the acquired battery identifiers, are then displayed together.

Accordingly, in a case of accepting the input operation from the user to cause the monitor to display mounted states of battery packs to a plurality of devices which the certain household has, the user can easily comprehend all battery packs mounted to each of all of the device that the certain household has, and the remaining charge of the batteries of each of the battery packs.

The information displaying method may further include: further acquiring, upon the battery pack being mounted to the device, a battery identifier to identify the battery pack, a device identifier to identify the device to which the battery pack has been mounted, a user identifier to identify a user that has mounted the battery pack, and date-and-time information indicating the date and time that the battery pack was mounted; storing the battery identifier, the device identifier, the user identifier, and the date-and-time information, that have been acquired, as usage history; identifying, upon the battery pack being mounted to the device, a user identifier associated with a battery pack mounted at generally the same point-in-time of a day different from the day where the battery pack was mounted, based on the usage history; and causing a monitor of a display device associated with the battery pack to display, in a case where the acquired user identifier and the identified user identifier are different, information indicating that the battery pack corresponding to the acquired battery identifier has been mounted to the device corresponding to the acquired device identifier.

In this case, upon the battery pack being mounted to the device, the user identifier to identify the user that has mounted the battery pack, and date-and-time information indicating the date and time that the battery pack was mounted, are further acquired. The battery identifier, the device identifier, the user identifier, and the date-and-time information, that have been acquired, are then stored as usage history. Upon the battery pack being mounted to the device, the user identifier associated with the battery pack mounted at generally the same point-in-time of the day different from the day where the battery pack was mounted, is identified based on the usage history, and in a case where the acquired user identifier and the identified user identifier are different, information indicating that the battery pack corresponding to the acquired battery identifier has been mounted to the device corresponding to the acquired device identifier is displayed at the monitor of the display device associated with the identified user identifier.

Accordingly, when a battery pack is mounted to a device, and the battery pack had been mounted by a different user at generally the same point-in-time of a day different to the day at which the battery pack has been mounted, the different user is notified that the battery pack has been mounted to the device, so the user who is routinely using the battery pack can be notified that a user other than the user who is routinely using the battery pack has used the battery pack.

The information displaying method may further include: further acquiring, upon the battery pack being mounted to the device, a battery identifier to identify the battery pack, a device identifier to identify the device to which the battery pack has been mounted, a user identifier to identify a user that has mounted the battery pack, and date-and-time information indicating the date and time that the battery pack was mounted; storing the battery identifier, the device identifier, the user identifier, and the date-and-time information, that have been acquired, as usage history; identifying the user using the battery pack, and identifying a timing at which to charge the battery pack, based on the usage history; and causing a monitor of a display device to display the timing at which to charge the battery pack at a display device associated with the identified user.

In this case, upon the battery pack being mounted to the device, the user identifier to identify the user that has mounted the battery pack, and date-and-time information indicating the date and time that the battery pack was mounted, are further acquired. The battery identifier, the device identifier, the user identifier, and the date-and-time information, that have been acquired, are then stored as usage history. The user using the battery pack is identified and the timing at which to charge the battery pack is identified, based on the usage history. The timing at which to charge the battery pack is then displayed at the display device associated with the identified user. Accordingly, the user routinely using the battery pack can be notified regarding when to charge the battery pack.

The information displaying method may further include: storing a table in which is correlated beforehand the battery pack, at least one device to which the battery pack is mounted, and a user using the battery pack; referencing the table, upon the battery pack being mounted to one of the plurality of devices, and determining whether or not the device to which the battery pack has been mounted is a device correlated with the user of the battery pack beforehand; and causing a monitor of a display device to display, in a case where the device to which the battery pack has been mounted is not a device correlated with the user of the battery pack beforehand, information that the battery pack has not been mounted to a device that has been correlated with the battery pack beforehand. The battery pack may be connectable to a plurality of devices, In this case, the battery pack is connectable to a plurality of devices. A table is stored in which is correlated beforehand the battery pack, at least one device to which the battery pack is mounted, and a user using the battery pack. Upon the battery pack being mounted to one of the plurality of devices, the table is referenced and determination is made regarding whether or not the device to which the battery pack has been mounted is the device correlated with the user of the battery pack beforehand. In a case where the device to which the battery pack has been mounted is not a device correlated with the user of the battery pack beforehand, information is displayed at the display device associated with the user of the battery pack that the battery pack has not been mounted to a device that has been correlated with the battery pack beforehand.

Accordingly, in a case where a battery pack is mounted to a device difference from a device registered beforehand, the user of the battery pack is notified that the battery pack is not mounted to the device registered beforehand, so the user routinely using the battery pack can tell that another user has used the battery pack.

The information displaying method may further include: acquiring position information indicating a current position of the battery pack; and causing the monitor to display the acquired position information. In this case, position information indicating the current position of the battery pack is displayed at the display device, so the user of the battery pack can identify the current position of the battery pack and the current position of the device to which the battery pack has been mounted.

According to another aspect of the present disclosure, an information displaying device displays information regarding a mounted state of a battery pack detachably mountable to a device. The information displaying device includes: an acquirer that acquires a battery identifier to identify the battery pack associated with a display device and a device identifier to identify the device to which the battery pack has been mounted; and a controller that causes a monitor of the display device to display information indicating that the battery pack corresponding to the acquired battery identifier has been mounted to the device corresponding to the acquired device identifier.

In this case, the battery identifier to identify the battery pack and the device identifier to identify the device to which the battery pack associated with the display device has been mounted are acquired. Information indicating that the battery pack corresponding to the acquired battery identifier has been mounted to the device corresponding to the acquired device identifier is then displayed at the monitor of the display device.

Accordingly, which device the battery pack has been mounted to is notified to the display device, so the user can comprehend the device to which the battery pack has been mounted.

Note that an arrangement may be made where the battery identifier to identify the battery pack and the device identifier to identify the device to which the battery pack has been mounted are acquired upon the battery pack being mounted to the device.

A battery pack, detachably mountable to a device, includes: a detector that detects having been mounted to the device; an acquirer that, upon detection being made by the detector, acquires a battery identifier to identify the battery pack and a device identifier to identify the device to which the battery pack has been mounted; and a transmitter that transmits the battery identifier and the device identifier to an external device.

In this case, the detector detects having been mounted to the device, the acquirer acquires a battery identifier to identify the battery pack and a device identifier to identify the device to which the battery pack has been mounted upon detection being made by the detector, and the transmitter transmits the battery identifier and the device identifier to an external device. Accordingly, the external device can notify the user to which device the battery pack has been mounted.

Overall Image of Service Provided

First an overall image of the service which the information management system according to the present embodiment provides will be described. FIG. 1A is a diagram illustrating an overall image of service provided by a control system according to the present embodiment. The control system includes a group 100, a data center operator 110, and a service provider 120.

The group 100 is, for example, a corporation, an organization, a home, or the like; the scale thereof is irrelevant. The group 100 has multiple devices 101 including a device A, device B, and device C, a home gateway 102, multiple battery packs 103, a distribution board 104, and a display device 105. The multiple devices 101 include those which are capable of connecting to the Internet, (e.g., a smartphone, personal computer (PC), television set, etc.), and those which are incapable of connecting to the Internet on their own (e.g., lighting, washing machine, refrigerator, etc.). There may be in the multiple devices 101 those which are incapable of connecting to the Internet on their own but can be connected to the Internet via the home gateway 102. A user 10 also uses the multiple devices 101 within the group 100.

The devices A and B are devices which are used indoors, such as a washing machine, refrigerator, vacuum cleaner, or the like, for example, and the device C is a device which is used outdoors, such as a bicycle, automobile, or the like, for example.

The multiple battery packs 103 are mounted to multiple devices 101 or the distribution board 104, thereby functioning as the power source for the multiple devices 101 or the distribution board 104.

The distribution board 104 supplies electric power supplied from a system power source to loads (multiple devices 101) provided in the building. The system power source is an electric power providing system which a power company provides. The distribution board 104 also charges the battery packs 103 that are mounted, and supplies power supplied from the battery packs 103 in time of power outage to the loads (devices 101).

The display device 105 is a device having a display function. The display device 105 is, for example, a smartphone, a personal computer, a tablet terminal, a cellular phone, a television, a home controller that controls the devices disposed within the group 100, and so forth. In other words, the display device 105 is an information terminal having a display (omitted from illustration).

The data center operator 110 includes the cloud server 111. The cloud server 111 is a virtual server which collaborates with various devices over the Internet. The cloud server 111 primarily manages massive data (big data) or the like that is difficult to handle with normal database management tools and the like. The data center operator 110 manages data, manages the cloud server 111, and serves as an operator of a data center which performs the management. The service that the data center operator 110 provides will be described in detail later.

Now, the data center operator 110 is not restricted a company which performs just management of data and operating the cloud server 111. For example, In a case where a device manufacturer which develops and manufactures one of the devices of the multiple devices 101 manages the data or manages the cloud server 111 or the like, the device manufacturer serves as the data center operator 110, as illustrated in FIG. 1B. Also, the data center operator 110 is not restricted to being a single company. For example, in a case where a device manufacturer and a management company manage data or manage the cloud server 111 either conjointly or in shared manner, as illustrated in FIG. 1C, both, or one or the other, serve as the data center operator 110.

The service provider 120 includes the server 121. The scale of the server 121 here is irrelevant, and also includes memory or the like in a PC used by an individual, for example. Further, there may be cases where the service provider 120 does not include a server 121.

Note that the home gateway 102 is not indispensable to the above-described service. For example, in a case where the cloud server 111 performs all data management, the home gateway 102 is not needed. Also, there are cases where there are no devices which cannot connect to the Internet by themselves, such as a case where all devices in the home are connected to the Internet. Note that the display device 105 may be one of the devices 101.

Next, The flow of information in the above service will be described. The device A and the device B in the group 100 each transmit log information to the cloud server 111 of the data center operator 110. The cloud server 111 collects log information from the device A and device B (arrow 131 in FIG. 1A). Here, log information is information indicating the operating state of the multiple devices 101 for example, date and time of operation, and so forth. For example, log information includes television viewing history, recorder programming information, date and time of the washing machine running, amount of laundry, date and time of the refrigerator door opening and closing, number of times of the refrigerator door opening and closing, and so forth, but is not restricted to these, and various types of information which can be acquired from the various types of devices may be included. The log information may be directly provided to the cloud server 111 from the multiple devices 101 themselves over the Internet. Alternatively, the log information may be temporarily collected from the devices 101 to the home gateway 102, and be provided from the home gateway 102 to the cloud server 111.

Also, the cloud server 111 collects log information from each of the multiple battery packs 103 (arrow 131 in FIG. 1A). Here, log information is information includes battery identifiers for identifying the battery packs and device identifiers for identifying the devices to which the battery packs are mounted. The log information may be directly provided to the cloud server 111 from the multiple battery packs 103 themselves over the Internet. Alternatively, the log information may be temporarily collected from the multiple battery packs 103 to the home gateway 102, and be provided from the home gateway 102 to the cloud server 111. Further, the log information may be output from the battery packs 103 to the devices 101 to which the battery packs 103 are mounted, and provided from the devices 101 to the cloud server 111.

Next, the cloud server 111 of the data center operator 110 provides the collected log information to the service provider 120 in certain increments. The certain increment here may be an increment in which the data center operator 110 can organize the collected information and provide to the service provider 120, or may be in increments requested by the service provider 120. Also, the log information has been described as being provided in certain increments, but the amount of information of the log information may change according to conditions, rather than being provided in certain increments. The log information is saved in the server 121 which the service provider 120 has, as necessary (arrow 132 in FIG. 1A).

The service provider 120 then organizes the log information into information suitable for the service to be provided to the user, and provides to the user. The user to which the information is to be provided may be the user 10 who uses the multiple devices 101, or may be an external user 20. An example of a way to provide information to the users 10 and 20 may be to directly provide information from the service provider 120 to the users 10 and 20 (arrows 133 and 134 in FIG. 1A). Also, an example of a way to provide information to the user 10 may be to route the information to the user 10 through the cloud server 111 of the data center operator 110 again (arrows 135 and 136 in FIG. 1A). Alternatively, the cloud server 111 of the data center operator 110 may organize the log information into information suitable for the service to be provided to the user, and provide to the service provider 120. Also, the user 10 may be different from the user 20 or may be the same.

The overall image of the service is the same in each of the embodiments described below, so the embodiments will be described using the same reference numerals. Note that the embodiments described below are all specific examples of the present disclosure. Values, shapes, components, steps, orders of steps, and so forth in the following embodiments are only exemplary, and do not restrict the present disclosure. Components in the following embodiments which are not included in an independent Claim indicating the highest concept are described as being optional components. Also, in all of the embodiments the contents of each can be combined.

First Embodiment

FIG. 2 is a diagram illustrating a schematic configuration of an information providing system according to a first embodiment of the present disclosure. Upon being mounted to one of the devices 101, each of the multiple battery packs 103 transmit log information to the cloud server 111 (or server 121) situated on the network. Also, upon being mounted to the distribution board 104, each of the multiple battery packs 103 transmit log information to the cloud server 111 (or server 121) situated on the network.

Note that the multiple devices are each of different types. Even if the devices which are of different types are of the same types, devices with different model Nos. or different shapes are included.

Upon a battery pack 103 being mounted to one of the multiple devices 101, the cloud server 111 (or server 121) acquires log information including a battery identifier for identifying the battery pack 103, and a device identifier for identifying the device to which the battery pack 103 has been mounted. The cloud server 111 (or server 121) effects control such that information, indicating that the battery pack corresponding to the acquired battery identifier is mounted to the device corresponding to the acquired device identifier, is displayed on the display device 105 associated with the battery identifier.

The display device 105 displays information indicating that the battery pack corresponding to the battery identifier has been mounted to the device corresponding to the acquired device identifier.

FIG. 3 is a diagram illustrating the hardware configuration of the information providing system according to the first embodiment of the present disclosure. The information providing system includes the device 101, battery pack 103, distribution board 104, display device 105, and cloud server 111, as illustrated in FIG. 3. The device 101 illustrates one device of the multiple devices, and the battery pack 103 illustrates one battery pack of the multiple battery packs. The device 101 includes a connection terminal 201, a communication unit 202, a control unit 203, and a storage unit 204.

The connection terminal 201 is a connection terminal for connecting to the battery pack 103. Electric power is supplied from the battery pack 103 via the connection terminal

201. The device 101 is provided with an accommodation portion (omitted from illustration) to accommodate the battery pack 103. Mounting the battery pack 103 to the accommodation portion mechanically and electrically connects a connection terminal 212 of the battery pack 103 and the connection terminal 201 of the device 101.

The communication unit 202 transmits information to the cloud server 111 via the network, and receives information from the cloud server 111 via the network. The communication unit 202 also transmits information to the battery pack 103 via the network, and receives information from the battery pack 103 via the network. The network between the communication unit 202 and the cloud server 111 may be the same as the network between the communication unit 202 and the battery pack 103, or may be different. The network between the communication unit 202 and the cloud server 111 is, for example, the Internet. The network between the communication unit 202 and the battery pack 103 is, for example, the Internet or a wireless local area network (LAN). The communication unit 202 may communicate with the battery pack 103 via the connection terminal 201. Note that the device 101 does not have to have the communication unit 202.

The control unit 203 is configured as a central processing unit (CPU) for example, and controls the overall device 101.

The storage unit 204 stores the device identifier for identifying the device 101 beforehand. Note that the storage unit 204 may store log information of the device 101.

Note that the configurations included in the device 101 are not restricted to the connection terminal 201, communication unit 202, control unit 203, and storage unit 204 alone. The device 101 further includes configurations to realize its primary functions.

The battery pack 103 includes a battery 211, the connection terminal 212, a charging circuit 213, a discharging circuit 214, a control unit 215, a communication unit 216, a storage unit 217, and a mounted state detecting unit 218.

The battery 211 is configured as a lithium-ion secondary battery, for example, and stores electricity.

The connection terminal 212 is a connection terminal to connect to the device 101 or the distribution board 104. In a case where the battery 211 is discharged, electric power is supplied to the device 101 or the distribution board 104 via the connection terminal 212. Also, in a case where the battery 211 is charged, electric power is supplied from the distribution board 104 via the connection terminal 212.

The mounted state detecting unit 218 detects that the battery pack 103 has been mounted to the device 101 or the distribution board 104. That is to say, the mounted state detecting unit 218 physically or electrically detects that the connection terminal 212 of the battery pack 103 and the connection terminal 201 of the device 101 or a connection terminal 221 of the distribution board 104 have come into contact. The mounted state detecting unit 218 also detects that the battery pack 103 has been dismounted from the device 101 or the distribution board 104. That is to say, the mounted state detecting unit 218 physically or electrically detects that the connection terminal 212 of the battery pack 103 and the connection terminal 201 of the device 101 or the connection terminal 221 of the distribution board 104 have been separated.

The charging circuit 213 charges the battery 211 using electric power input via the connection terminal 212.

The discharging circuit 214 outputs electric power discharged from the battery 211.

The control unit 215 is configured as a CPU, for example, and controls the overall battery pack 103.

The communication unit 216 transmits information to the cloud server 111 via the network, and also receives information from the cloud server 111 via the network. The communication unit 216 also transmits information to the device 101 via the network, and also receives information from the battery pack 103 via the network. The network between the communication unit 216 and the cloud server 111 may be the same as the network between the communication unit 216 and the device 101, or may be different. The network between the communication unit 216 and the cloud server 111 is, for example, the Internet. The network between the communication unit 216 and the device 101 is, for example, the Internet or a wireless LAN. The communication unit 216 may communicate with the device 101 via the connection terminal 212.

The storage unit 217 stores a battery identifier for identifying the battery pack 103 beforehand.

The distribution board 104 includes the connection terminal 221, a control unit 222, a power supply unit 223, a communication unit 224, and a storage unit 225.

The connection terminal 221 is a connection terminal to connect to the battery pack 103. Electric power is supplied from the battery pack 103 via the connection terminal 221. The distribution board 104 is provided with an accommodation portion (omitted from illustration) to accommodate the battery pack 103. Mounting the battery pack 103 to the accommodation portion mechanically and electrically connects the connection terminal 212 of the battery pack 103 and the connection terminal 221 of the distribution board 104. Note that the number of battery packs 103 mounted to the distribution board 104 is not restricted to one; multiple battery packs 103 may be mounted to the distribution board 104.

The control unit 222 is configured as a CPU for example, and controls the overall distribution board 104.

The power supply unit 223 supplies electric power from the system power source to loads (multiple devices 101) provided to the building. In a case of charging the battery pack 103, the power supply unit 223 supplies electric power to the battery pack 103. In a case where no electric power is supplied from the system power source during a power outage, for example, the power supply unit 223 switches the supply source of power from the system power source to the battery pack 103, and supplies power from the battery pack 103 to the loads (multiple devices 101) provided to the building.

Note that in a case where power is not supplied from the system power source, the power supply unit 223 does not have to supply power from the battery pack 103 to all devices 101; power may be supplied from the battery pack 103 only to devices 101 to which power should be constantly supplied. An example of a device 101 to which power should be constantly supplied is a refrigerator.

The communication unit 224 transmits information to the cloud server 111 via the network, and receives information from the cloud server 111 via the network. The communication unit 224 also transmits information to the battery pack 103 via the network, and receives information from the battery pack 103 via the network. The network between the communication unit 224 and the cloud server 111 may be the same as the network between the communication unit 224 and the battery pack 103, or may be different. The network between the communication unit 224 and the cloud server 111 is, for example, the Internet. The network between the communication unit 224 and the battery pack 103 is, for example, the Internet or a wireless local area network (LAN). The communication unit 224 may communicate with the battery pack 103 via the connection terminal 221. Note that the distribution board 104 does not have to have the communication unit 224.

The storage unit 225 stores a device identifier for identifying the distribution board 104 beforehand.

The display device 105 includes a control unit 251, a communication unit 252, memory 253, a speaker 254, a microphone 255, a monitor 256, and an input unit 257.

The control unit 251 is configured as a CPU, for example, and controls the overall display device 105.

The communication unit 252 transmits information to the cloud server 111 via the network, and receives information from the cloud server 111 via the network. The network between the communication unit 252 and the cloud server 111 is, for example, the Internet.

The memory 253 stores various types of information. The speaker 254 outputs audio. The microphone 255 acquires audio. The monitor 256 is configured as a liquid crystal display device, for example, and displays various types of information. The input unit 257 accepts input from the user. Note that the display device 105 does not have to have the memory 253, speaker 254, microphone 255, and input unit 257.

The cloud server 111 includes a control unit 231, a communication unit 232, and a storage unit 233.

The control unit 231 is configured as a CPU, for example, and controls the overall cloud server 111.

The communication unit 232 transmits information to the device 101, battery pack 103, distribution board 104, and display device 105 via the network, and receives information from the device 101, battery pack 103, distribution board 104, and display device 105 via the network. The network between the communication unit 232 and the device 101, battery pack 103, distribution board 104, and display device 105 is, for example, the Internet. The storage unit 233 stores log information transmitted by the device 101 and log information transmitted by the battery pack 103.

Figure 4:
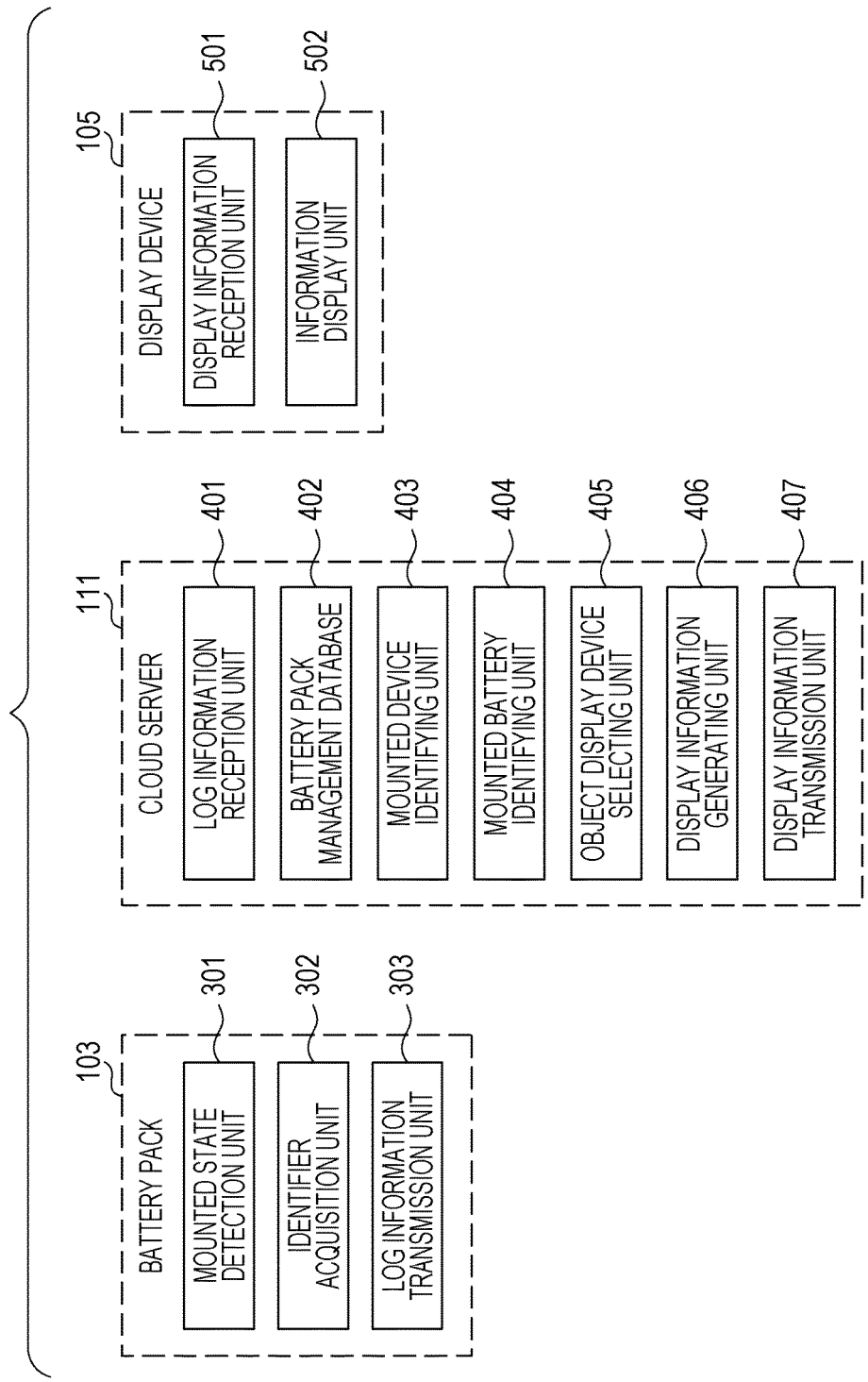
FIG. 4 is a functional block diagram illustrating the configuration of a battery pack, display device, and cloud server according to the first embodiment of the present disclosure.

FIG. 4 is a functional block diagram illustrating the configuration of a battery pack, display device, and cloud server according to the first embodiment of the present disclosure. The battery pack 103 includes a mounted state detection unit 301, an identifier acquisition unit 302, and a log information transmission unit 303. Note that the mounted state detecting unit 218 illustrated in FIG. 3 includes the mounted state detection unit 301, the control unit 215 illustrated in FIG. 3 includes the identifier acquisition unit 302, and the communication unit 216 illustrated in FIG. 3 includes the log information transmission unit 303. Configurations which are the same as the configurations in FIG. 3 are denoted by the same reference numerals, and description thereof will be omitted.

The identifier acquisition unit 302 acquires, from the device 101 mounted to the battery pack 103, the device identifier for identifying the device 101, and also acquires the battery identifier for identifying the battery pack 103.

The log information transmission unit 303 transmits the device identifier and battery identifier, acquired by the identifier acquisition unit 302, to the cloud server 111. Note that the log information may include, in addition to the device identifier and battery identifier, a user household identifier for identifying the household of the user, a mounted state indicating whether the battery pack 103 is mounted or detached, and date-and-time information indicating the date and time that the battery pack 103 was mounted or detached. The user household identifier is stored in the storage unit 217 of the battery pack 103 beforehand, with the mounting state being detected by the mounted state detection unit 301 and the date-and-time information being acquired from a clock unit (omitted from illustration) upon the battery pack 103 being mounted or detached. The mounting state and the date-and-time information are also stored in the storage unit 217. That is to say, the log information transmitted from the log information transmission unit 303 is stored in the storage unit 217.

The cloud server 111 includes a log information reception unit 401, a battery pack management database 402, a mounted device identifying unit 403, a mounted battery identifying unit 404, an object display device selecting unit 405, a display information generating unit 406, and a display information transmission unit 407. Note that the communication unit 232 illustrated in FIG. 3 includes the log information reception unit 401 and the display information transmission unit 407, the storage unit 233 illustrated in FIG. 3 includes the battery pack management database 402, and the control unit 231 illustrated in FIG. 3 includes the mounted device identifying unit 403, mounted battery identifying unit 404, object display device selecting unit 405, and display information generating unit 406.

The log information reception unit 401 receives the log information transmitted from the battery pack 103. Upon the battery pack 103 having been mounted to one of the multiple devices, the log information reception unit 401 acquire the battery identifier for identifying the battery pack 103 and the device identifier for identifying the device to which the battery pack 103 has been mounted.

The battery pack management database 402 stores the device identifier and battery identifier included in the log information received by the log information reception unit 401 in increments of user households (groups).

FIG. 5 is a diagram illustrating an example of data stored in the battery pack management database according to the present first embodiment. The battery pack management database 402 stores a battery pack ID (battery identifier), device ID (device identifier), mounted state, and date-and-time information, correlated with a user household ID (user household identifier). For example, it can be understood that in a household corresponding to user household ID "0XX168", a battery pack corresponding to battery pack ID "1" has been mounted to a device corresponding to device ID "XX01", at 58 minutes past 10 o'clock on Dec. 17, 2013. Note that the user household ID (user household identifier) may be included in the received log information. The storage unit 233 may also store beforehand a table in which are correlated the battery pack ID (battery identifier) or device ID (device identifier) and the user household ID (user household identifier). The log information reception unit 401 may acquire the user household ID corresponding to the battery pack ID or device ID included in the received log information from the table, and store this in the battery pack management database 402.

The mounted device identifying unit 403 identifies the device 101 to which the battery pack 103 has been mounted. The mounted battery identifying unit 404 identifies the battery pack 103 which has been mounted to the device 101.

The object display device selecting unit 405 selects a display device associated with the battery pack ID. That is to say, the storage unit 233 stores beforehand a table associating battery pack IDs and display devices 105. The object display device selecting unit 405 acquire the display device 105 corresponding to the battery pack ID included in the received log information from the table.

Note that the storage unit 233 may store beforehand the table associating device IDs and display devices 105. The object display device selecting unit 405 may acquire the display device 105 corresponding to the device ID included in the received log information from the table.

The display information generating unit 406 generates display information to be displayed on the display device 105, indicating that the battery pack corresponding to the acquired battery identifier has been mounted to the device corresponding to the acquired device identifier.

The display information transmission unit 407 transmits display information generated by the display information generating unit 406 to the display device 105 selected by the object display device selecting unit 405. Accordingly, the display information transmission unit 407 controls the display device 105 associated to the battery identifier to display the information indicating that the battery pack corresponding to the acquired battery identifier has been mounted to the device corresponding to the acquired device identifier. Also, upon the battery pack 103 being mounted to one of the multiple devices, the display information transmission unit 407 controls the display device 105 associated to the battery identifier to display information indicating that the battery pack corresponding to the acquired battery identifier has been mounted to the device corresponding to the acquired device identifier.

The display device 105 includes display information reception unit 501 and information display unit 502. The display information reception unit 501 receives display information transmitted from the cloud server 111. The information display unit 502 displays the display information received by the display information reception unit 501 on the monitor 256.

Figure 6:
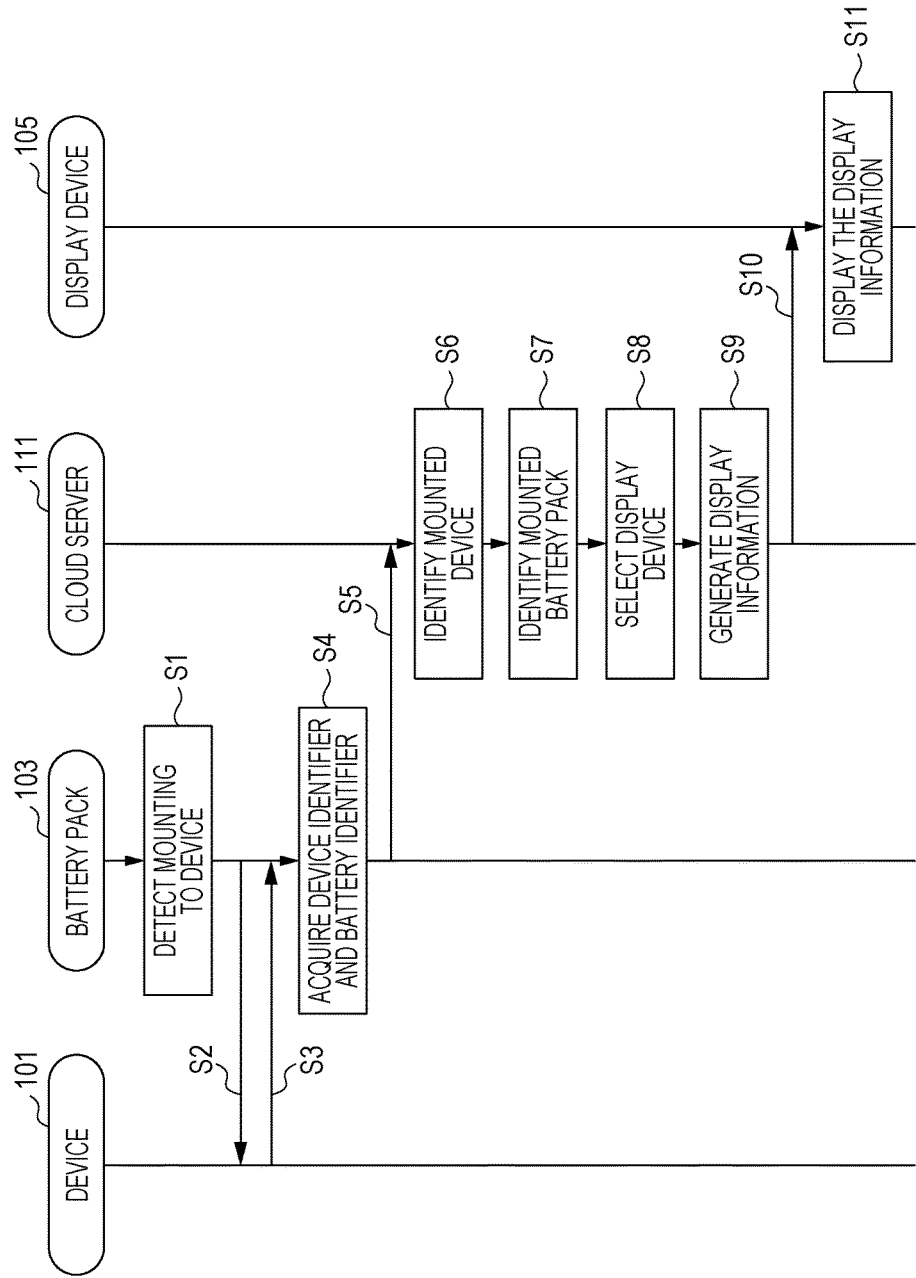
FIG. 6 is a sequence diagram illustrating the operations of the information providing system according to the first embodiment of the present disclosure.

FIG. 6 is a sequence diagram illustrating the operations of the information providing system according to the first embodiment of the present disclosure. First, in step S1, the mounted state detection unit 301 of the battery pack 103 detects that the battery pack 103 has been mounted to the device 101. The mounted state detection unit 301 detects that it has been mounted to the device 101 as follows, for example. Upon the battery pack 103 being mounted to the device 101, electric power is supplied from the battery pack 103 to the control unit 203 of the device 101. The control unit 203 of the device 101 raises the voltage on the communication line between the battery pack 103 and itself to a predetermined voltage or higher, to enable communication with the battery pack 103 via the communication unit 202. The battery pack 103 detects that normal connection to the device 101 has been made, based on this signal (the raised voltage). Note that the above-described is one example, and the method by which the mounted state detection unit 301 detects being mounted to the device 101 is not restricted to the above method.

Next, in step S2, the identifier acquisition unit 302 of the battery pack 103 transmits a request signal to the device 101 to which it has been mounted, requesting a device identifier. The communication unit 202 of the device 101 receives the request signal transmitted from the battery pack 103.

Next, in step S3, the control unit 203 of the device 101 reads out the device identifier from the storage unit 204, and transmits it to the battery pack 103 via the communication unit 202. The communication unit 216 of the battery pack 103 receives the device identifier transmitted from the device 101.

Next, in step S4, the identifier acquisition unit 302 of the battery pack 103 acquires the device identifier received by the communication unit 216, and also acquires the battery identifier stored in the storage unit 217.

Next, in step S5, the log information transmission unit 303 of the battery pack 103 generates log information including the device identifier and battery identifier acquired by the identifier acquisition unit 302, and transmits the generated log information to the cloud server 111. The log information reception unit 401 of the cloud server 111 receives the log information transmitted from the battery pack 103.

Next, in step S6, the mounted device identifying unit 403 of the cloud server 111 identifies the device 101 to which the battery pack 103 has been mounted, based on the device identifier included in the log information received by the log information reception unit 401.

Next, in step S7, the mounted battery identifying unit 404 of the cloud server 111 identifies the battery pack 103 which has been mounted to the device 101, based on the battery identifier included in the log information received by the log information reception unit 401.

Next, in step S8, based on the battery identifier included in the log information received by the log information reception unit 401, the object display device selecting unit 405 of the cloud server 111 selects a display device associated with this battery identifier. Note that the number of display devices associated with one battery identifier is not restricted to one; multiple display devices may be associated with one battery identifier.

Next, in step S9, the display information generating unit 406 of the cloud server 111 generates display information for notifying that the battery pack identified by the mounted battery identifying unit 404 is mounted to the device identified by the mounted device identifying unit 403.

Next, in step S10, the display information transmission unit 407 of the cloud server 111 transmits the display information generated by the display information generating unit 406 to the display device 105 selected by the object display device selecting unit 405. The display information reception unit 501 of the display device 105 receive the display information transmitted from the cloud server 111.

Next, in step S11, the information display unit 502 of the display device 105 displays the display information received by the display information reception unit 501 on the monitor 256.

Figure 7:
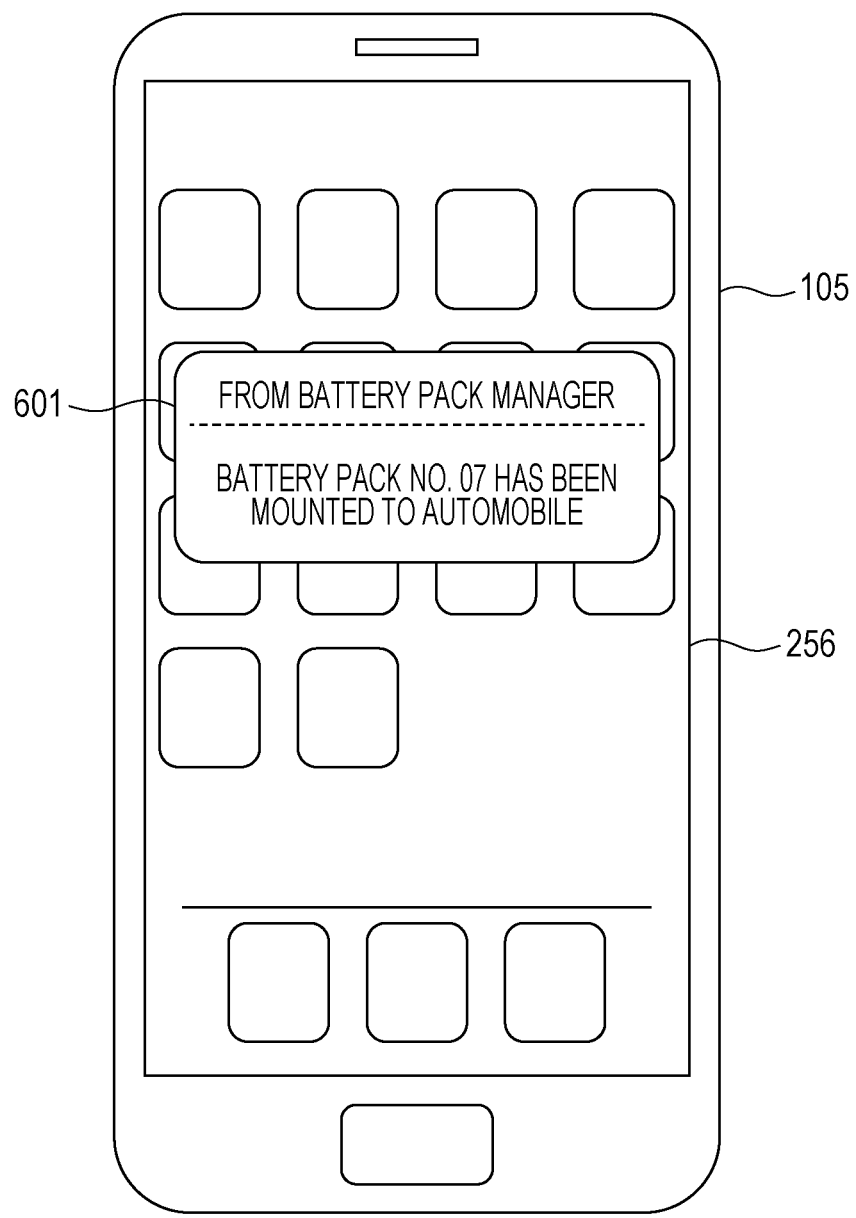
FIG. 7 is a diagram illustrating an example of display information displayed on a monitor of the display device in the first embodiment.

FIG. 7 is a diagram illustrating an example of display information displayed on a monitor of the display device in the present first embodiment. Based on the device identifier included in the log information, the mounted device identifying unit 403 identifies the device 101 to which the battery pack 103 has been mounted to be an automobile. Also, based on the battery identifier included in the log information, the mounted battery identifying unit 404 identifies the battery pack 103 mounted to the device 101 to be battery pack No. 7. As a result, the display information generating unit 406 generates display information to the effect that "BATTERY PACK NO. 07 HAS BEEN MOUNTED TO AUTOMOBILE".

The information display unit 502 of the display device 105 then displays this display information 601 "BATTERY PACK NO. 07 HAS BEEN MOUNTED TO AUTOMOBILE" on the monitor 256.

Although description is made in the present embodiment regarding a case where a battery pack is mounted to a device, the same operations as those above are performed in a case where a battery pack is mounted to the distribution board, as well. Also, although description is made in the present embodiment regarding a case where a battery pack is mounted to a device, the same operations as those above are performed in a case where a battery pack is detached from the device, as well.

Although notification is made from the cloud server 111 to the display device 105 that the battery pack has been mounted to the device or distribution board at the timing that the battery pack is mounted to the device or distribution board in the present embodiment, notification of the mounting state of the battery pack may be made from the cloud server 111 to the display device 105 at the timing of having received a request to confirm the mounting state of the battery pack from the display device.

Next, the information providing system according to a modification of the first embodiment of the present disclosure will be described. In the above-described first embodiment, upon a battery pack having been mounted to one of the multiple devices, the cloud server 111 controls the display device associated with the battery identifier to display information indicating that the battery pack corresponding to the acquired battery identifier is mounted to the device corresponding to the acquired device identifier. Conversely, in the modification of the first embodiment, upon having received a request to display the mounting state of a battery pack corresponding to a battery identifier associated with a display device, the cloud server 111 controls the display device associated with the battery identifier to display information indicating that the battery pack corresponding to the acquired battery identifier is mounted to the device corresponding to the acquired device identifier.

Figure 8:
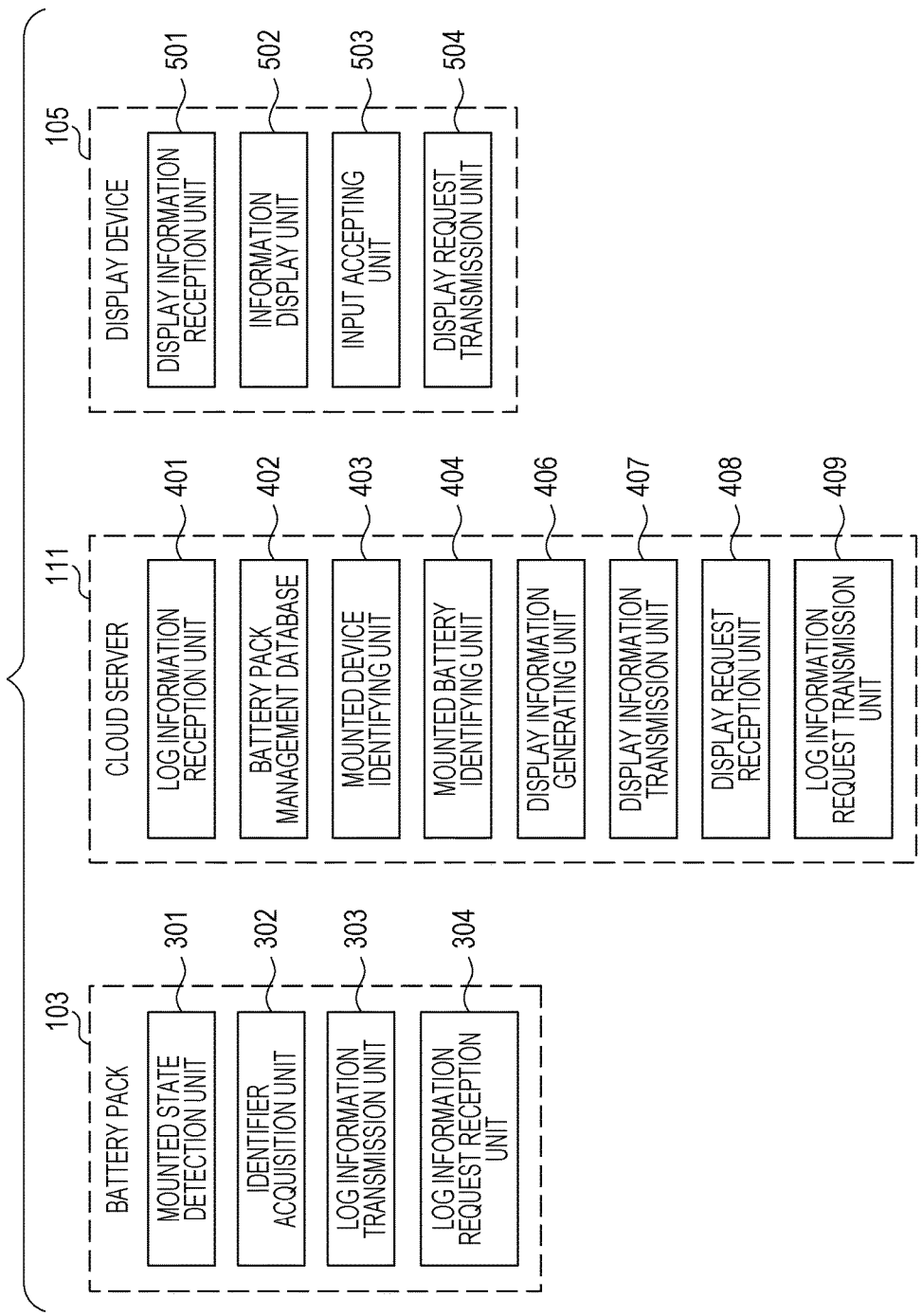
FIG. 8 is a functional block diagram illustrating the configuration of the battery pack, display device, and cloud server according to a modification of the first embodiment of the present disclosure.

FIG. 8 is a functional block diagram illustrating the configuration of the battery pack, display device, and cloud server according to the modification of the first embodiment of the present disclosure. Note that the hardware configuration of the information providing system according to the modification of the first embodiment is the same as the hardware configuration of the information providing system of the first embodiment illustrated in FIG. 3, so description will be omitted. Configurations which are the same as the battery pack, display device, and cloud server illustrated in FIG. 4 are denoted with the same reference numerals, and description thereof will be omitted.

The display device 105 includes the display information reception unit 501, information display unit 502, and also an input accepting unit 503, and a display request transmission unit 504. Note that the input unit 257 illustrated in FIG. 3 includes the input accepting unit 503, and the communication unit 252 illustrated in FIG. 3 includes the display request transmission unit 504.

The input accepting unit 503 accepts input operations from the user, to display the mounted state of the battery pack corresponding to the battery identifier associated with the display device 105. The display request transmission unit 504 transmit a display request to display the mounted state of the battery pack corresponding to the battery identifier associated with the display device 105, to the cloud server 111.

The cloud server 111 includes the log information reception unit 401, battery pack management database 402, mounted device identifying unit 403, mounted battery identifying unit 404, display information generating unit 406, display information transmission unit 407, and also a display request reception unit 408 and a log information request transmission unit 409. The communication unit 232 illustrated in FIG. 3 includes the display request reception unit 408 and log information request transmission unit 409.

The display request reception unit 408 receive a display request transmitted from the display device 105. The mounted battery identifying unit 404 acquires the battery identifier associated with the display device 105 which has transmitted the display request, and identifies the battery pack corresponding to the acquired battery identifier. Note that the display request includes a display device identifier to identify the display device 105, and the storage unit 233 stores this display device identifier in an associated manner with the battery identifier. The association of the display device identifier with the battery identifier is set by the user beforehand.

The log information request transmission unit 409 transmits a log information request to acquire log information, to the battery pack 103 identified by the mounted battery identifying unit 404. Note that the log information includes at least the battery identifier and the mounted state indicating whether or not the battery pack 103 is mounted to a device. In a case where the battery pack 103 is connected to a device, the device identifier is also included.

The mounted device identifying unit 403 identifies the device 101 to which the battery pack 103 is mounted, based on the device identifier included in the log information. The mounted device identifying unit 403 also identifies all devices in the home to which battery packs can be mounted. The storage unit 233 of the cloud server 111 stores beforehand a table correlating battery packs to be displayed on the display device, with the multiple devices capable of mounting these battery packs, out of the multiple devices situated in the home of the user. The mounted device identifying unit 403 identifies the multiple devices 101 correlated with the display device 105 that has transmitted to the display request.

The display information generating unit 406 generates display information for notification of the mounted state of the identified battery pack. This display information includes information indicating the multiple devices to be displayed on the display device 105, and information relating to which of the multiple devices to be displayed on the display device 105 that the battery pack to be displayed on the display device 105 has been mounted to.

The battery pack 103 includes the mounted state detection unit 301, identifier acquisition unit 302, log information transmission unit 303, and also a log information request reception unit 304. Note that the communication unit 216 illustrated in FIG. 3 includes the log information request reception unit 304.

The log information request reception unit 304 receive log information requests transmitted from the cloud server 111. The log information transmission unit 303 acquires the log information, and transmits the acquired log information to the cloud server 111.

Figure 9:
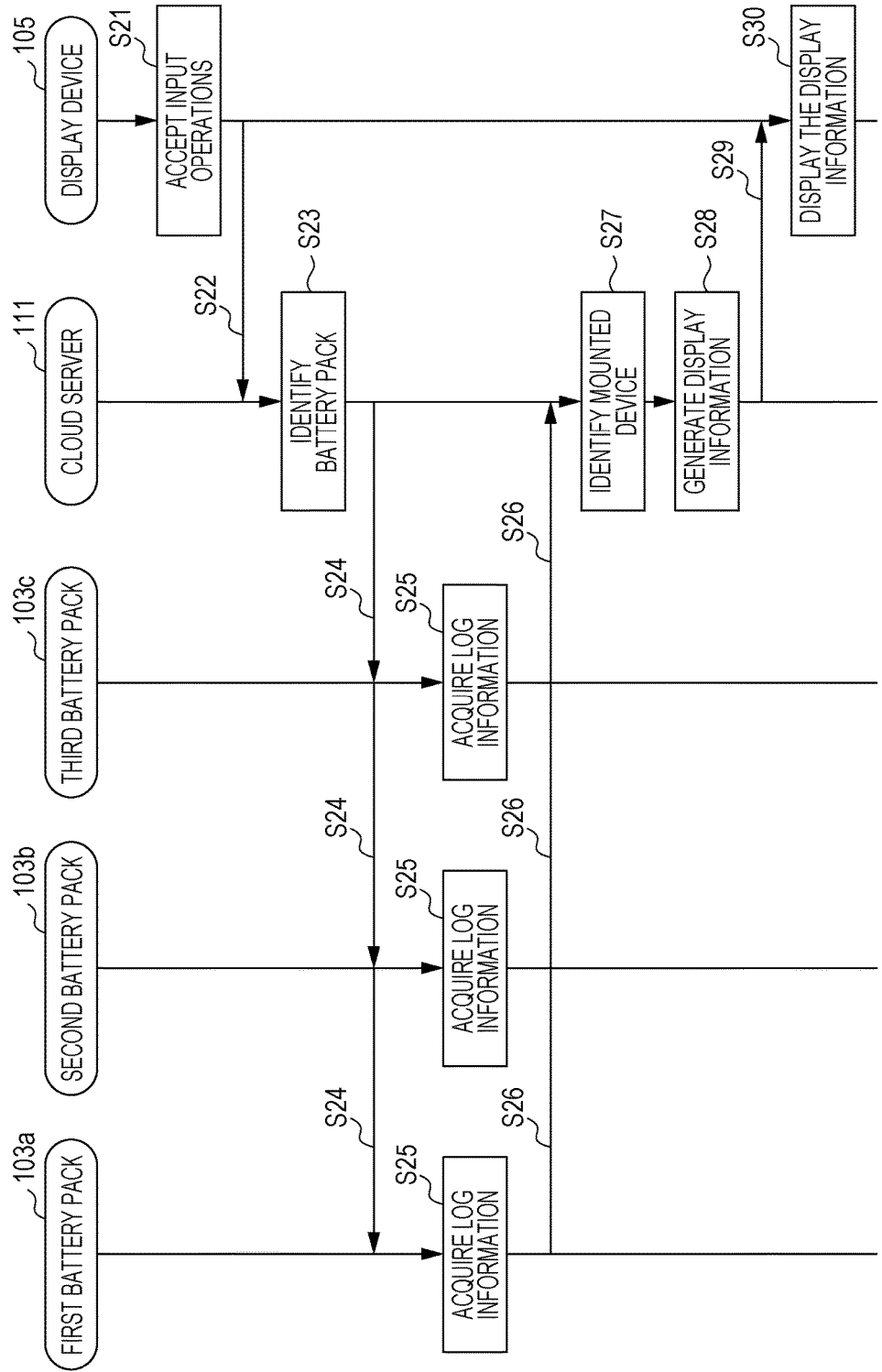
FIG. 9 is a sequence diagram illustrating the operations of the information providing system according to the modification of the first embodiment of the present disclosure.

FIG. 9 is a sequence diagram illustrating the operations of the information providing system according to the modification of the first embodiment of the present disclosure. First, in step S21, the input accepting unit 503 of the display device 105 accepts input operations by the user, to display the mounted state of the battery pack corresponding to the battery identifier associated with the display device 105.

Next, in step S22, the display request transmission unit 504 of the display device 105 transmits a display request to display the mounted state of the battery pack corresponding to the battery identifier associated with the display device 105, to the cloud server 111. The display request reception unit 408 of the cloud server 111 receives the display request transmitted from the display device 105.

Next, in step S23, the mounted battery identifying unit 404 of the cloud server 111 acquires the battery identifiers associated with the display device 105 which has transmitted the display request, and identifies the battery packs corresponding to the acquired battery identifier. Three battery identifiers are associated with the display device 105 which has transmitted the display request, for example, the three battery identifiers corresponding to a first battery pack 103a, a second battery pack 103b, and a third battery pack 103c, respectively.

Next, in step S24, the log information request transmission unit 409 of the cloud server 111 transmits a log information request to the identified battery packs 103 (first battery pack 103a, second battery pack 103b, third battery pack 103c), to acquire log information. The respective log information request reception unit 304 of the first battery pack 103a, second battery pack 103b, and third battery pack 103c receive the log information request transmitted from the cloud server 111.

Next, in step S25 the respective log information transmission unit 303 of the first battery pack 103a, second battery pack 103b, and third battery pack 103c acquires log information. This log information has been acquired at the time of mounting the battery pack, and stored in the storage unit 217. The log information transmission unit 303 thus acquires the log information by reading out the log information from the storage unit 217.

Note that the log information transmission unit 303 may have the mounted state detection unit 301 to confirm whether or not connected to the device, at the time of receiving the log information request from the cloud server 111. If connected to the device, the identifier acquisition unit 302 may acquire the device identifier from the device.

Next, in step S26, the respective log information transmission unit 303 of the first battery pack 103a, second battery pack 103b, and third battery pack 103c transmit the acquired log information to the cloud server 111. The log information reception unit 401 of the cloud server 111 receives the log information transmitted from each of the first battery pack 103a, second battery pack 103b, and third battery pack 103c.

Next, in step S27, the mounted device identifying unit 403 of the cloud server 111 identifies the devices 101 to which the first battery pack 103a, second battery pack 103b, and third battery pack 103c are mounted, based on the device identifier included in the received log information, and identify the multiple devices 101 correlated with the display device 105 which has transmitted the display request. At this time, not all of the multiple devices 101 correlated with the display device 105 may necessarily have a battery pack mounted.

Next, in step S28, the display information generating unit 406 of the cloud server 111 generates display information for notification of the mounted state of the identified battery packs. The display information at this time includes information indicating the multiple devices to be displayed on the display device 105, and information relating to which of the multiple devices to be displayed on the display device 105 that the battery packs to be displayed on the display device 105 have been mounted to.

Next, in step S29, the display information transmission unit 407 of the cloud server 111 transmits the generated display information to the display device 105 which has transmitted the display request. The display information reception unit 501 of the display device 105 receive the display information transmitted from the cloud server 111.

Next, in step S30, the information display unit 502 of the display device 105 displays the received display information on the monitor 256. Thus, when accepting a request to display the mounted state of battery packs 103 corresponding to battery identifiers associated with a display device 105, to devices 101, the cloud server 111 may control the display device associated with the battery identifiers to display information indicating that the battery packs corresponding to the acquired battery identifiers are mounted to device corresponding to the acquired device identifiers. Thus, the user can confirm whether or not the battery packs are mounted to devices, and if mounted to devices, the user can confirm to which devices the battery packs are mounted.

Figure 10:
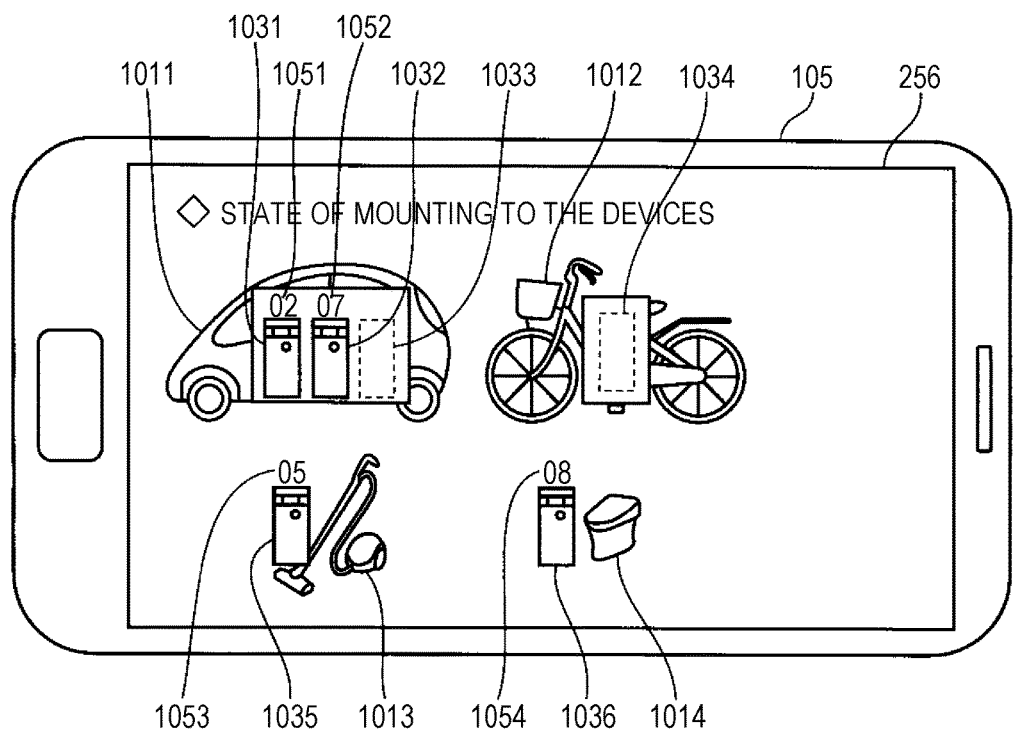
FIG. 10 is a diagram illustrating an example of display information displayed on the monitor of the display device in the modification of the first embodiment.

FIG. 10 is a diagram illustrating an example of display information displayed on the monitor of the display device in the modification of the present first embodiment. For example, four battery packs are associated with the display device 105, as well as four devices being associated therewith. The four battery packs are a battery pack No. 2, a battery pack No. 5, a battery pack No. 7, and a battery pack No. 8. The four devices are an automobile, a bicycle, a vacuum cleaner, and a toilet device.

The information display unit 502 of the display device 105 displays a device image 1011 indicating the automobile, a device image 1012 indicating the bicycle, a device image 1013 indicating the vacuum cleaner, and a device image 1014 indicating the toilet device. The information display unit 502 also displays battery images 1031, 1032, 1033, and 1034, indicating the mounted states of battery packs, superimposed on the device images 1011 and 1012. The battery images 1031 and 1032 illustrated in FIG. 10 represent the battery pack No. 2 and battery pack No. 7 respectively, and the battery images 1033 and 1034 indicate that these battery packs are not mounted. Further, the information display unit 502 display battery images 1035 and 1036 at the perimeter of the device images 1013 and 1014, indicating the mounted state of battery packs. The battery images 1035 and 1036 illustrated in FIG. 10 represent the battery pack No. 5 and battery pack No. 8, respectively.

The display screen illustrated in FIG. 10 further has displayed information 1051, 1052, 1053, and 1054, for identifying battery packs corresponding to battery identifiers. Each information 1051, 1052, 1053, and 1054 is a name for identifying each of the multiple battery packs in the home, indicated by numbers such as "02" and "07", for example. "02" represents battery pack No. 2, and "07" represents battery pack No. 7.

The control unit 231 of the cloud server 111 thus effects control so that battery images (second image) indicating the mounted state of battery packs are disposed around device images (first image) indicating devices that have been mounted with battery packs. The control unit 231 of the cloud server 111 also effects control so that the battery images (second image) indicating the mounted state of battery packs are disposed superimposed on the device images (first image) indicating devices that have been mounted with battery packs. Thus, the user can be presented with which battery packs have been mounted to which devices.

The control unit 231 of the cloud server 111 may, upon having received a request from a certain display device to display the battery pack mounted state of a certain device out of the multiple devices, acquire information relating to the number of battery packs that can be mounted to the certain device and the mounted state of the battery pack. The control unit 231 of the cloud server 111 may then, based on the acquired information, display the number of battery packs that can be mounted to the certain device in an identifiable manner, and also display a state in which a battery pack is mounted and a state in which a battery pack is not mounted, in mutually different display forms. That is to say, three battery packs can be mounted to the device corresponding to the device image 1011 in FIG. 10, so three battery images 1031, 1032, and 1033 are displayed. Further, two battery packs are mounted to the device corresponding to the device image 1011, the battery images 1031 and 1032 are displayed indicating that the battery packs are mounted, and the battery image 1033 is displayed indicating that the battery pack is not mounted. The battery images 1031 and 1032 are images representing battery packs. The battery image 1033 is displayed by dashed lines, indicating that the battery pack is not mounted.

Also displayed along with battery images indicating that battery packs are mounted, is information for identifying the battery packs that have been mounted out of the multiple battery packs in the home. For example, information for identifying battery packs is displayed above the battery images representing the battery packs in FIG. 10, such as "02" corresponding to battery pack No. 2 being displayed above the battery image 1031. This allows which battery pack in the home is mounted to which device to be easily comprehended.

Although the mounted state of battery packs corresponding to multiple devices to which battery packs can be mounted in the home is displayed in the present embodiment, the present disclosure is not restricted to this in particular; an arrangement may be made where only which devices have been mounted with battery packs associated with the display device is displayed.

Although the cloud server 111 obtains log information from the battery pack 103 after having accepted a display request from the display device 105 in the present embodiment, the present disclosure is not restricted to this in particular. An arrangement may be made where the cloud server 111 receives log information at the point of the battery pack 103 being mounted to the device 101, with the received log information being stored in the storage unit 233. The cloud server 111 may then read out the log information stored in the storage unit 233 and generate display information at the time of accepting the display request from the display device 105.

Also, upon the user making a request to display the mounted state of battery packs 103 in the present embodiment, the display request is transmitted to the cloud server 111, log information is read out from the storage unit 233 of the cloud server 111, and display information is generated, but this is not restrictive.

An arrangement may be made where the display request is transmitted to a battery pack 103 associated with the display device, the display device 105 acquires log information from the storage unit 217 of the battery pack 103, and acquires display information. The display information here is not generated at the cloud server 111 but within the display device 105. That is to say, the display device 105 has a display information generating unit having functions the same as the display information generating unit 406.

Although multiple devices associated with the display device beforehand are displayed in the present embodiment, with the state of mounting the battery packs to the devices also being displayed, the present disclosure is not restricted to this in particular. The display request transmitted from the display device to the cloud server may include information specifying a device regarding which the mounted state of a battery pack is to be displayed, and the specified device may be displayed along with display of the mounted state of the battery pack to the specified device.

Further, although multiple devices associated with a display device beforehand are displayed in the present embodiment, the present disclosure is not restricted to this in particular; the user household ID and multiple devices may be associated beforehand, with all devices associated with the user household ID being displayed. In this case, the cloud server 111 may acquire information relating to the number of battery packs which can be mounted to each of all devices which a certain household has, and the mounted state of the battery packs, when accepting a request from a certain display device to display the mounted state of battery packs of multiple devices which the certain household has. The cloud server 111 may then display the number of battery packs which can be mounted to each of all devices which the certain household has, in an identifiable manner, and also display a state in which a battery pack is mounted and a state in which a battery pack is not mounted, in mutually different display forms.

The storage unit 233 of the cloud server 111 may also store a table correlating beforehand battery packs, at least one device to which a battery pack is mounted, and a user using the battery pack. Upon a battery pack being mounted to one device of multiple devices, the control unit 231 of the cloud server 111 may reference the table, and determine whether or not the device to which the battery pack has been mounted is a device correlated with the user of the battery pack beforehand. Further, in a case where the device to which the battery pack has been mounted is not a device correlated with the user of the battery pack beforehand, the control unit 231 of the cloud server 111 may display on the display device, associated with the user of the battery pack, information indicating that the battery pack is not mounted to a device correlated with the battery pack.

Accordingly, in a case where the battery pack is mounted to a device other than a device registered beforehand, the user of the battery pack is notified that the battery pack is not mounted to a device registered beforehand, so the user who usually uses the battery pack can know that some other user has used the battery pack.

The battery pack 103 may also include a Global Positioning System (GPS) function (hereinafter simply "GPS"), and in a case where the battery pack is mounted to a device, current position information may be acquired from the GPS and the acquired current position information transmitted to the cloud server 111 included in the log information. The cloud server 111 may control a display device 105 associated with a battery pack to display the current position information of the battery pack as current position information of the device to which the battery pack has been mounted. In this case, the current position of the battery pack is notified to the user at the time of a stolen battery pack being mounted to a device by a person who has stolen the battery pack, so the user of the battery pack can tell the current position of the stolen battery pack.

The battery pack 103 may include a GPS, and may acquire current position information from the GPS at a predetermined timing, and transmit the acquired current position information to the cloud server 111. The cloud server 111 may control the display device 105 associated with the battery pack to display the current position information of the battery pack. The cloud server 111 may control a display device 105 associated with the battery pack to display the current position information of the battery pack as current position information of the device to which the battery pack has been mounted.

In this case, the current position of the battery pack is notified to the user as current position information in a case where a device to this the battery pack has been mounted is stolen, so the user of the battery pack can tell the current position of the stolen device.

Also, although the identifier acquisition unit 302 of the battery pack 103 acquires the device identifier for identifying the device 101 from the device 101 to which the battery pack 103 is mounted in the present embodiment, the present disclosure is not restricted to this in particular. Upon detecting having been mounted to a device 101 by the mounted state detection unit 301, the identifier acquisition unit 302 may send a predetermined current to the device 101 and measure the resistance value, thereby identifying the device 101. In this case, the identifier acquisition unit 302 may store resistance values and types of the devices 101 beforehand, and identify the type of the device 101 based on the measured resistance value.

The multiple devices may be classified into three types of devices with a large load, devices with a medium load, and devices with a small load, according to the magnitude of the load. In this case, the identifier acquisition unit 302 of the battery pack 103 may identify whether which of a devices with a large load, device with a medium load, or device with a small load, the device to which it has been mounted is, in accordance with the measured resistance value.

Second Embodiment

In the first embodiment, which device a battery pack is mounted to is displayed. Conversely, a second embodiment not only displays which device a battery pack is mounted to, but also displays the state of charge of the battery pack, the usage state, and the life expectancy.

Figure 11:
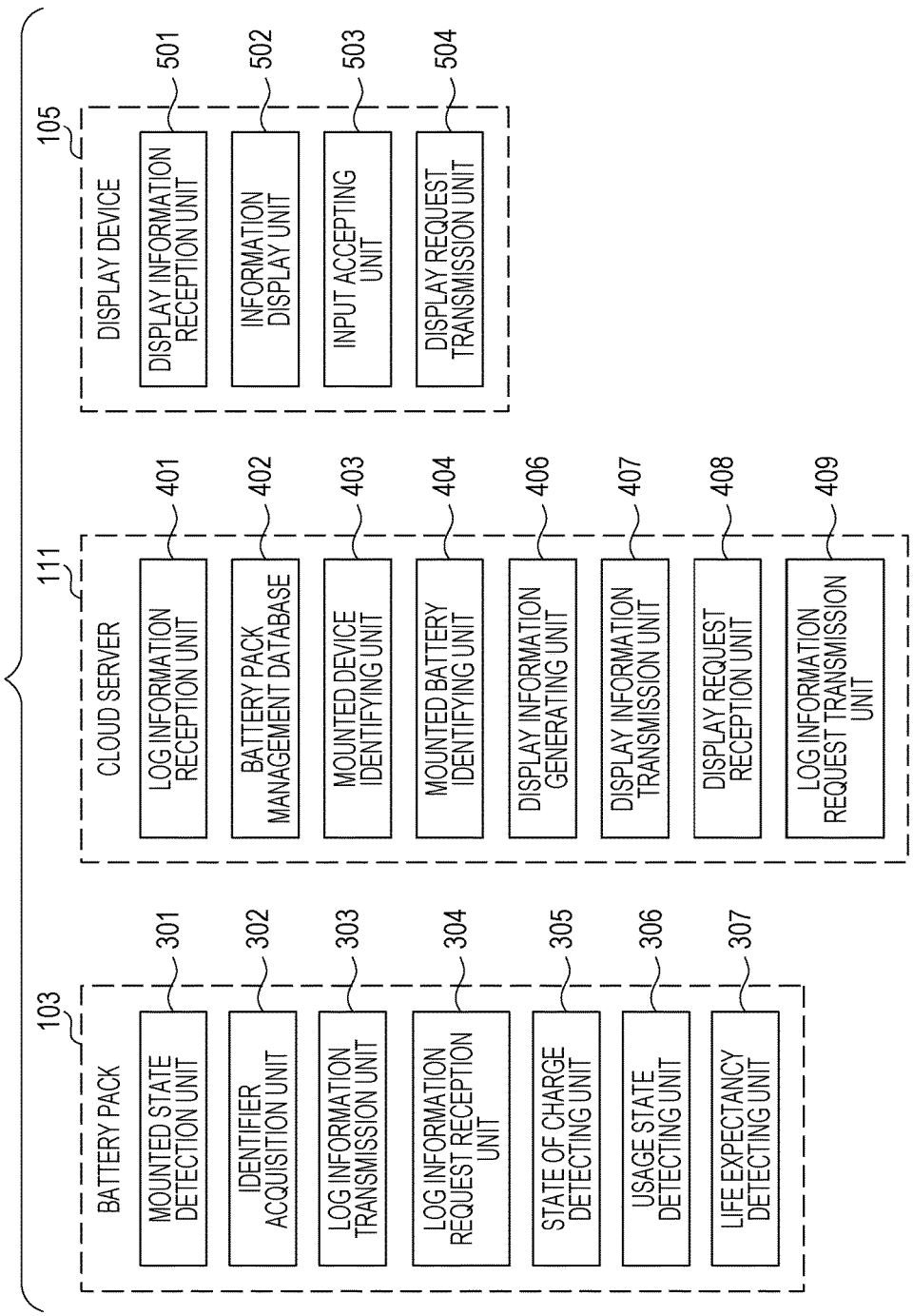
FIG. 11 is a functional block diagram illustrating the configuration of the battery pack, display device, and cloud server according to a second embodiment of the present disclosure.

FIG. 11 is a functional block diagram illustrating the configuration of the battery pack, display device, and cloud server according to a second embodiment of the present disclosure. Note that the hardware configuration of the information providing system according to the second embodiment is the same as the hardware configuration of the information providing system of the first embodiment illustrated in FIG. 3, so description will be omitted. Configurations in FIG. 11 which are the same as the battery pack, display device, and cloud server according to the modification of the first embodiment illustrated in FIG. 8 are denoted with the same reference numerals, and description thereof will be omitted.

The battery pack 103 includes the mounted state detection unit 301, identifier acquisition unit 302, log information transmission unit 303, log information request reception unit 304, and also a state of charge detecting unit 305, a usage state detecting unit 306, and a life expectancy detecting unit 307. Note that the control unit 215 illustrated in FIG. 3 includes the state of charge detecting unit 305, usage state detecting unit 306, and life expectancy detecting unit 307.

The state of charge detecting unit 305 detects the state of charge, indicating the remaining amount of electricity stored in the battery 211 of the battery pack 103. The usage state detecting unit 306 detects the usage state of the battery pack 103, indicating the usage period from the battery pack 103 having started being used up to the present. Note that the storage unit 217 of the battery pack 103 stores the date on which usage of the battery pack 103 started. For example, the usage state detecting unit 306 calculates the usage period from the date on which usage of the battery pack 103 started that is stored in the storage unit 217.

The life expectancy detecting unit 307 estimates the life expectancy of the battery 211 that the battery pack 103 has. For example, the life expectancy detecting unit 307 estimates the life expectancy of the battery 211 using the charge/discharge cycle of the battery 211. The storage unit 217 of the battery pack 103 stores the charge/discharge cycle of the battery 211. Conventional art can be applied to the method of estimating the life expectancy of a battery using the charge/discharge cycle, so description will be omitted here.

The log information transmission unit 303 transmits to the cloud server 111 log information including the device identifier and battery identifier acquired by the identifier acquisition unit 302, the state of charge detected by the state of charge detecting unit 305, the usage state detected by the usage state detecting unit 306, and the life expectancy of the battery 211 estimated by the life expectancy detecting unit 307. Note that the log information may further include a user household identifier for identifying the user household, mounted/detached state indicating whether the battery pack 103 is mounted or detached, and date information indicating the data on which the battery pack 103 was mounted or detached.

Although the state of charge, usage state, and life expectancy is transmitted along with the device identifier and battery identifier at the time of the battery pack 103 being mounted to the device 101 in the present embodiment, the present disclosure is not restricted to this in particular; the state of charge, usage state, and life expectancy may be transmitted at a predetermined timing, such as daily, hourly, or the like. Further, the log information transmission unit 303 may transmit log information including the state of charge, usage state, and life expectancy in response to a request from the display device 105.

The cloud server 111 includes the log information reception unit 401, battery pack management database 402, mounted device identifying unit 403, mounted battery identifying unit 404, display information generating unit 406, display information transmission unit 407, display request reception unit, 408 and log information request transmission unit 409.

The battery pack management database 402 stores the device identifier, battery identifier, state of charge, usage state, and life expectancy included in the log information received by the log information reception unit 401, for each user.

The display information generating unit 406 generates information indicating the multiple devices to be displayed at the display device 105, and display information including information relating to which of the multiple device to be displayed on the display device 105 that the battery packs to be displayed on the display device 105 are mounted to. The display information generating unit 406 also generates display information including information relating to battery packs, in response to a display request from the display device 105. The information relating to battery packs includes the state of charge, usage state, and life expectancy.

The display device 105 includes the display information reception unit 501, information display unit 502, input accepting unit 503, and display request transmission unit 504.

The input accepting unit 503 accepts instructions to display information relating to battery packs, by user input operations. The display request transmission unit 504 transmits display requests to display information relating to battery packs to the cloud server 111.

Figure 12:
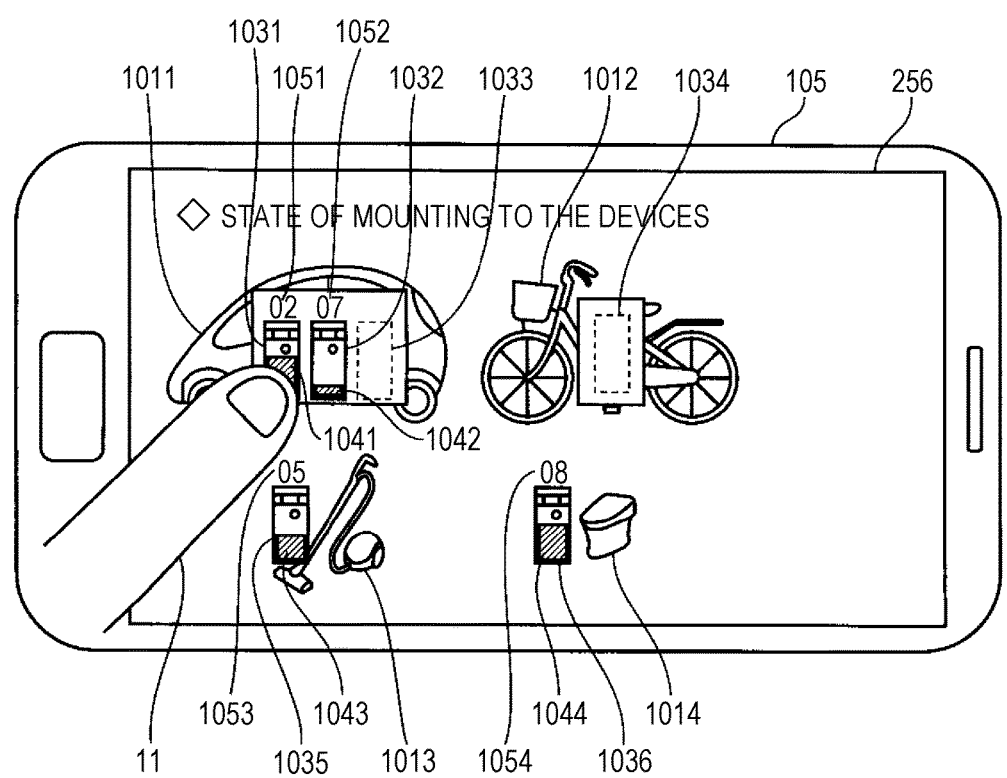
FIG. 12 is a diagram illustrating an example of display information displayed on the monitor of the display device in the second embodiment.

FIG. 12 is a diagram illustrating an example of display information displayed on the monitor of the display device in the present second embodiment. The display screen displayed in the present second embodiment as illustrated in FIG. 12 is almost the same as the display screen according to the first modification illustrated in FIG. 10. Note however, that the display screen illustrated in FIG. 12 displays the battery images 1031, 1032, 1035, and 1036, indicating that the battery packs have been mounted, and also state of charge images 1041, 1042, 1043, and 1044, indicating the states of charge of the battery packs. The display information generating unit 406 of the cloud server 111 generates the display information including the states of charge of the battery packs. The states of charge are represented by bar graphs corresponding to the remaining charge in the batteries, as illustrated in FIG. 12.

The display screen illustrated in FIG. 12 further has displayed the information 1051, 1052, 1053, and 1054, for identifying battery packs corresponding to battery identifiers. Each information 1051, 1052, 1053, and 1054 is a name for identifying each of the multiple battery packs in the home, indicated by numbers such as "02" and "07", for example. "02" represents battery pack No. 2, and "07" represents battery pack No. 7.

The cloud server 111 thus acquires the battery identifiers of all battery packs mounted to a certain device, and the remaining charge of the battery which each battery pack has, when accepting a request from the certain device to display the mounting state of the battery packs of the certain device out of the multiple devices. The cloud server 111 then effects control so as to display information for identifying the battery packs corresponding to the acquired battery identifiers, and the remaining charge of the battery packs corresponding to the acquired battery identifiers.

The monitor 256 is configured as a touch panel, with battery images 1031, 1032, 1035, and 1036, representing the battery packs, being selectably displayed. When a finger 11 of the user touches one of the battery images 1031, 1032, 1035, and 1036, information relating to the battery pack corresponding to the touched battery image is displayed.

The input accepting unit 503 accepts input of the battery images 1031, 1032, 1035, and 1036, from the user. The display request transmission unit 504 transmit to the cloud server 111 a display request to display information relating to the battery pack corresponding to the battery image which the user has selected. The display information generating unit 406 generate display information including information relating to the battery pack, in response to the display request from the display device 105.

Figure 13:
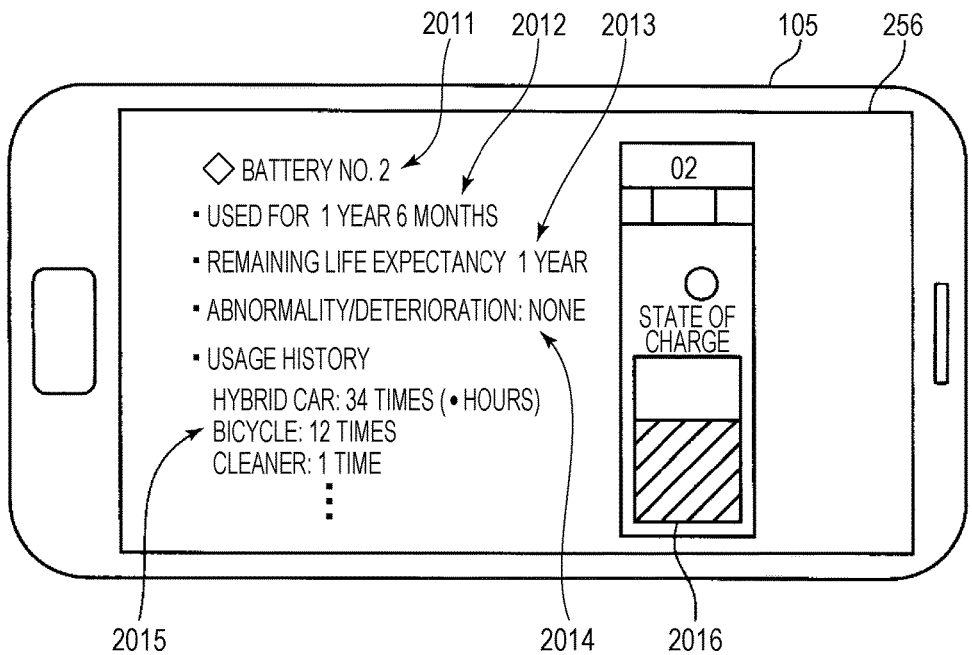
FIG. 13 is a diagram illustrating an example of display information including information relating to a battery pack selected by the user, according to the second embodiment.

FIG. 13 is a diagram illustrating an example of display information including information relating to the battery pack selected by the user, according to the present second embodiment. In a case where the battery image 1031 illustrated in FIG. 12 is selected, the display information illustrated in FIG. 13 is displayed on the monitor 256 of the display device 105.

As illustrated in FIG. 13, the display information includes information 2011 for identifying the battery pack, information 2012 relating to the usage period of the battery pack, information 2013 relating to the life expectancy of the battery pack, information 2014 relating to whether or not there is abnormality or deterioration of the battery pack, information 2015 relating to usage history of the battery pack, and information 2016 relating to the state of charge of the battery pack.

The information 2011 represents which battery pack of the multiple battery packs in the home the information relates to. In FIG. 13, "BATTERY NO. 2" is displayed for the information 2011. The information 2012 represents the usage period of the battery pack. In FIG. 13, "1 YEAR 6 MONTHS" is displayed for the information 2012. The information 2013 represents the life expectancy of the battery pack. In FIG. 13, "REMAINING LIFE EXPECTANCY 1 YEAR" is displayed for the information 2013.

The information 2014 represents whether or not the battery pack is in an abnormal state or a deteriorated state. The battery pack is in neither an abnormal state nor a deteriorated state in FIG. 13, so "ABNORMALITY/DETE-RIORATION: NONE" is displayed as the information 2014. In a case where the battery pack is in an abnormal state or a deteriorated state, "ABNORMALITY/DETERIORATION: PRESENT" is displayed as the information 2014. Information regarding whether or not the battery pack is in an abnormal state or a deteriorated state is included in the log information.

The information 2015 represents the usage history of the battery pack, and indicates how many times the battery pack has been used by each device. In FIG. 13, "HYBRID CAR: 34 TIMES", "BICYCLE: 12 TIMES", and "CLEANER: 1 TIME" are displayed as the information 2015. Display may also be made regarding how many hours the battery pack has been used by each device, not just the number of times of use of the battery pack.

Information 2016 represents the state of charge of the battery pack. In FIG. 13, a bar graph indicates the remaining charge in the battery as the information 2016.

In this way, information relating to the battery pack is displayed, such as the information 2012 relating to the usage period of the battery pack, information 2013 relating to the life expectancy of the battery pack, information 2014 relating to whether or not there is abnormality or deterioration of the battery pack, information 2015 relating to usage history of the battery pack, and information 2016 relating to the state of charge of the battery pack. Accordingly, the user can easily confirm the current state of the battery pack. Note that in the second embodiment, the cloud server 111 may effect control so as to display advertisement information, to prompt the user to purchase a replacement battery pack.

Figure 14:
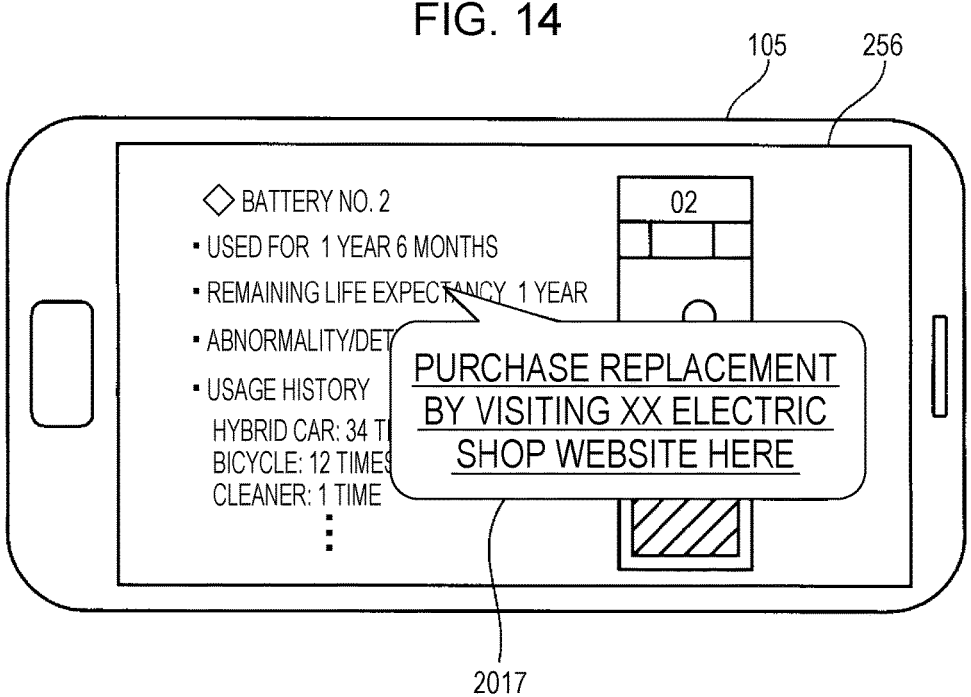
FIG. 14 is a diagram illustrating an example of display information including advertisement information to prompt the user to purchase a replacement battery pack according to the second embodiment.

FIG. 14 is a diagram illustrating an example of display information including advertisement information to prompt the user to purchase a replacement battery pack, according to the present second embodiment. In a case where the battery image 1031 illustrated in FIG. 12 has been selected, the display information illustrated in FIG. 14 is displayed on the monitor 256 of the display device 105.

The display screen displayed in FIG. 14 is almost the same as the content of the display screen illustrated in FIG. 13. Note however, that the display screen illustrated in FIG. 14 includes advertisement information 2017 to prompt the user to purchase a replacement battery pack. In a case where the life expectancy is within one year, for example, the display information generating unit 406 of the cloud server 111 generates display information including the advertisement information 2017. In this case, the storage unit 233 of the cloud server 111 stores a Uniform Resource Locator (URL), indicating a Web site of a vendor vending battery packs, beforehand.

The advertisement information 2017 includes hypertext for displaying the Web site of the vendor vending battery packs, and is displayed superimposed on information relating to the battery pack. Upon the finger 11 of the user coming into contact with the advertisement information 2017 in FIG. 14, the Web site of the vendor vending battery packs is displayed.

Note that the display device 105 may transmit position information acquired by GPS to the cloud server 111, and the cloud server 111 may search for a vendor nearby the display device 105 based on the received position information, and effect control so as to display a vendor that has been found as the advertisement information 2017.

Thus, advertisement information 2017 to prompt the user to purchase a replacement battery pack is displayed in accordance with the life expectancy of the battery pack, so the user can purchase a replacement battery pack before the battery pack becomes unusable.

Also, the information relating to the battery pack in the present second embodiment may include devices which can operate in a case where the current battery pack is mounted. The internal resistance of batteries incases by repeated charging and discharging. In a case where a battery of which the internal resistance has increased is used in a device requiring a larger current, such as an automobile or the like, the voltage of the battery drops. If the voltage of the battery falls to or below a cutoff voltage of the device, the device stops operating. Accordingly, a battery of which the internal resistance has increased due to deterioration may not be usable with a large current load device. Accordingly, the cloud server 111 effects control so as to display information indicating devices which can operate if the current battery pack is mounted.

Figure 15:
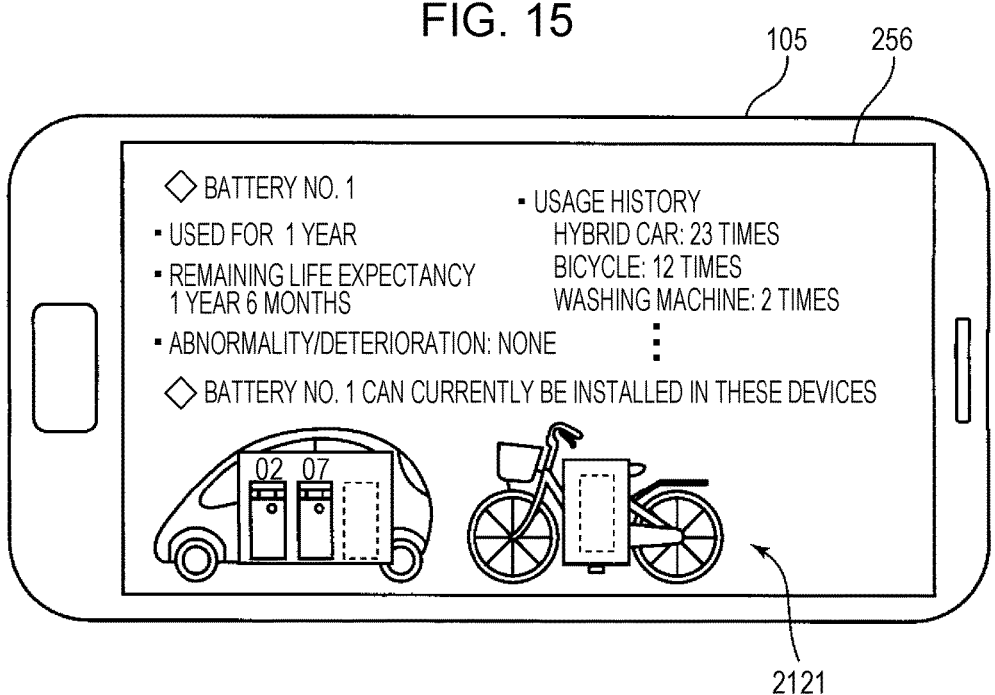
FIG. 15 is a diagram illustrating an example of display information including information of devices which can be operated in a case of mounting the current battery pack, according to the second embodiment.

FIG. 15 is a diagram illustrating an example of display information including information of devices which can be operated in a case of mounting the current battery pack, according to the present second embodiment. The content of the display information illustrated in FIG. 15 is almost the same as the content of the display information illustrated in FIG. 13. Note however, that the display screen illustrated in FIG. 15 includes information 2121 indicating devices which can operate in a case of the current battery pack being mounted. The storage unit 233 of the cloud server 111 stores beforehand a table correlating devices and the number of times of charging/discharging which will render the battery pack unusable in the device, for each battery pack. The display information generating unit 406 of the cloud server 111 identifies devices which can be operated in a case of mounting the current battery pack, based on the number of times of charging/discharging acquired from the battery pack, and generates display information including the information 2121 indicating the identified devices.

Thus, devices which can operate in a case of mounting the current battery pack are displayed, so the user can identify which devices the battery pack can be mounted to. Also, the cloud server 111 may effect control so as to display information indicating devices which can operate if the current battery pack is mounted, and information indicating devices which will not operate if the current battery pack is mounted.

Figure 16:
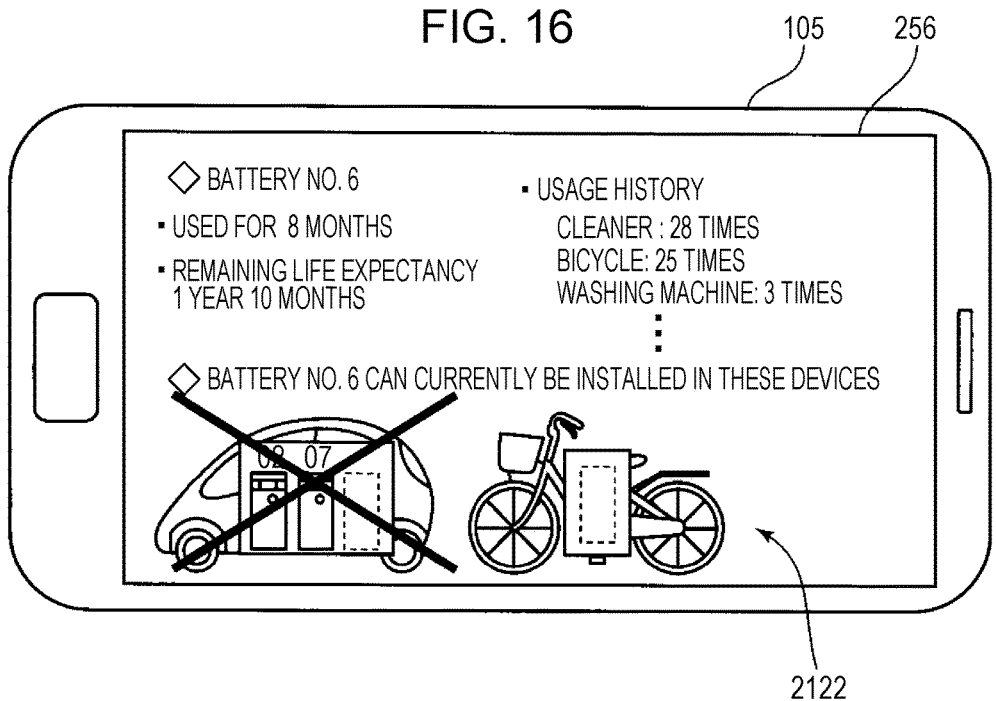
FIG. 16 is a diagram illustrating an example of display information including information of a device which can be operated in a case of mounting the current battery pack, and information of a device which will not operate in a case of mounting the current battery pack, according to the second embodiment.

FIG. 16 is a diagram illustrating an example of display information including information of devices which can be operated in a case of mounting the current battery pack, and information indicating devices which will not operate if the current battery pack is mounted, according to the present second embodiment. The content of the display information illustrated in FIG. 16 is almost the same as the content of the display information illustrated in FIG. 13. Note however, that the display screen illustrated in FIG. 16 includes information 2122 indicating devices which can operate in a case of the current battery pack being mounted and devices which cannot be operated if the current battery pack is mounted. The storage unit 233 of the cloud server 111 stores beforehand a table correlating devices and the number of times of charging/discharging which will render the battery pack unusable in the device, for each battery pack. The display information generating unit 406 of the cloud server 111 identifies devices which can be operated in a case of mounting the current battery pack, based on the number of times of charging/discharging acquired from the battery pack, and generates display information including the information 2122 indicating devices which can operate in a case of the current battery pack being mounted and devices which cannot be operated if the current battery pack is mounted.

The devices which can operate in a case of the current battery pack being mounted and the devices which cannot be operated if the current battery pack is mounted are displayed in different forms from each other, as illustrated in FIG. 16. Devices which can operate in a case of the current battery pack being mounted are displayed with an image representing that device. Devices which cannot be operated if the current battery pack is mounted are displayed with a mark indicating unusable superimposed over an image representing that device.

Thus, devices which can operate in a case of mounting the current battery pack and devices which cannot be operated if the current battery pack is mounted are displayed, so the user can easily identify which devices cannot be operated if the current battery pack is mounted, and thus can mount appropriate battery packs to each device. The cloud server 111 may also effect control so as to display an operating button to control operation of the battery pack.

Figure 17:
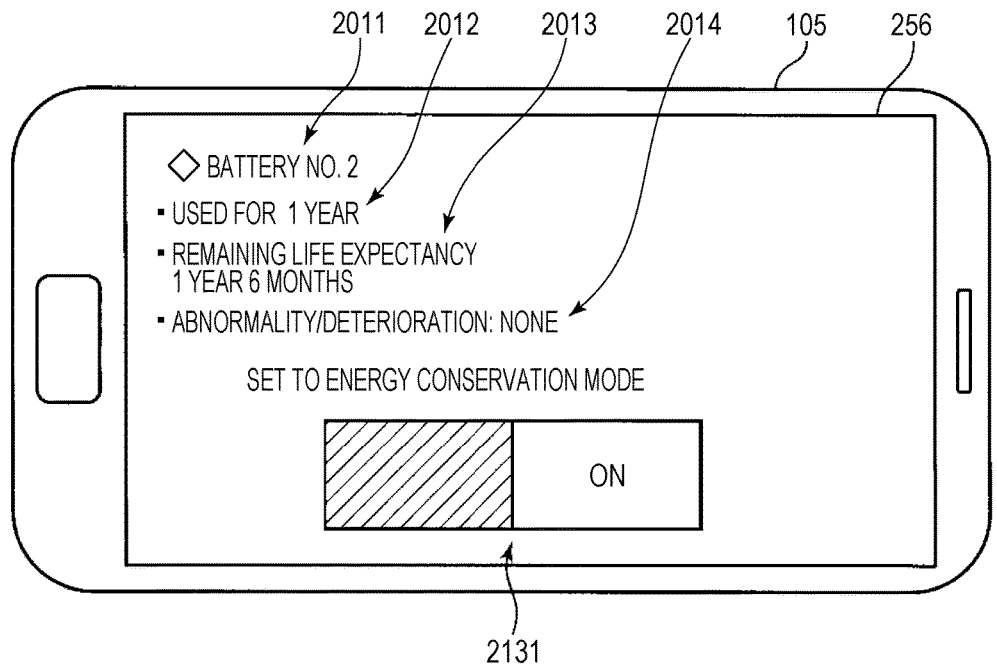
FIG. 17 is a diagram illustrating an example of display information including an operating button for controlling a battery pack selected by the user, according to the second embodiment.

FIG. 17 is a diagram illustrating an example of display information including an operating button for controlling a battery pack selected by the user, according to the present second embodiment. In a case where the battery image 1031 illustrated in FIG. 12 is selected, the display information illustrated in FIG. 17 is displayed on the monitor 256 of the display device 105. As illustrated in FIG. 17, the display information includes information 2011 for identifying the battery pack, information 2012 relating to the usage period of the battery pack, information 2013 relating to the life expectancy of the battery pack, information 2014 relating to whether or not there is abnormality or deterioration of the battery pack, and an operating button 2131 to control operations of the battery pack.

The operating button 2131 is an operating button for setting the battery pack regarding whether or not to operate in an energy conservation mode. In a case of being set to the energy conservation mode, the output power of the battery pack is suppressed, and accordingly can be used for long periods of time. When the finger of the user touches the operating button 2131, the display switches between "ON" where the energy conservation mode is set, and "OFF" where the energy conservation mode is not set. Upon the operating mode (e.g., energy conservation mode) of the battery being changed by operating the operating button 2131, the communication unit 232 of the cloud server 111 transmits control information for changing the operating mode to the battery pack. Upon receiving the control information from the cloud server 111, the battery pack changes the operating mode according to the received control information. Thus, battery packs mounted to devices can be remotely controlled.

Note that the cloud server 111 may store user individual IDs for identifying users, battery packs, and battery pack operation content, in a correlated manner beforehand. In this case, identifying a battery pack and user at the time of the battery pack being mounted enables battery packs to be made to operate according to control corresponding to the identified user. The method for identifying the user will be described later.

Description has been made so far regarding a case where battery packs are mounted to devices, but the same processing is performed in cases where battery packs are mounted to a distribution board as well.

Figure 18:
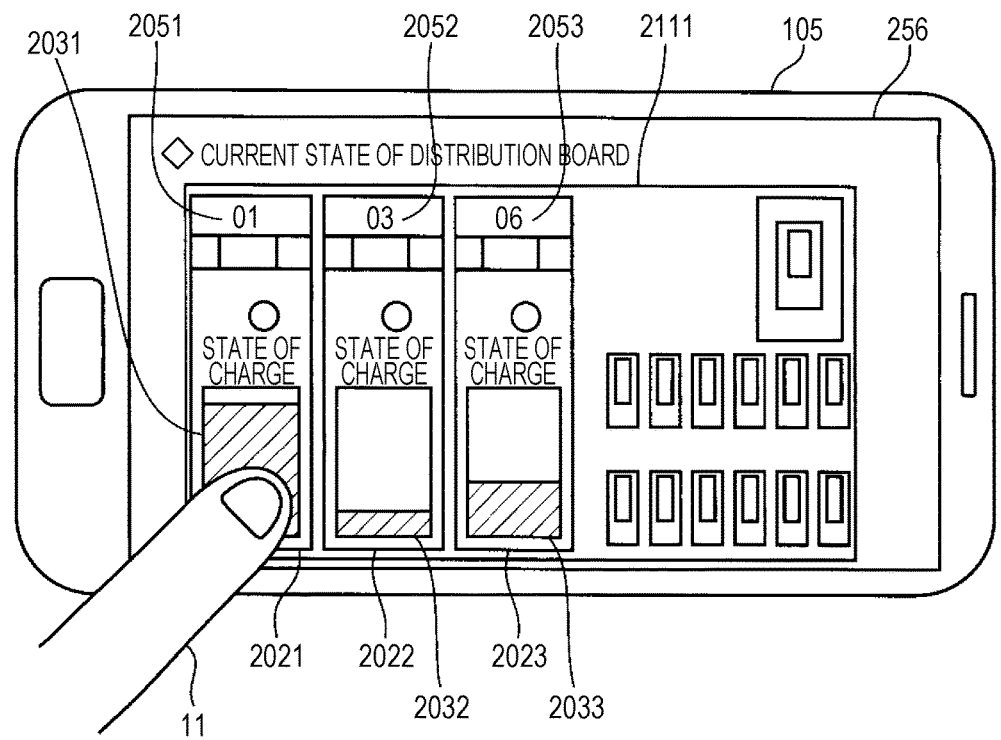
FIG. 18 is a diagram illustrating an example of display information displayed on the monitor of the display device in a case where a battery pack has been mounted to a distribution board, according to the second embodiment.

FIG. 18 is a diagram illustrating an example of display information displayed on the monitor of the display device in a case where a battery pack has been mounted to a distribution board, according to the present second embodiment. When a battery pack 103 is mounted to the distribution board 104, the display information illustrated in FIG. 18 is displayed on the monitor 256 of the display device 105. The display information illustrated in FIG. 18 may be displayed not only when a battery pack 103 is mounted to the distribution board 104, but also in a case where instructions for displaying the state of the distribution board 104 have been accepted by the input unit 257.

Displayed in the display screen illustrated in FIG. 18 are a distribution board image 2111 representing the distribution board, battery images 2021, 2022, and 2023 indicating that battery packs are mounted, and state-of-charge images 2031, 2032, and 2033 indicating the state of charge of the battery packs. The display information generating unit 406 of the cloud server 111 generates display information including the state of charge of the battery packs. The states of charge are represented by bar graphs corresponding to the remaining charge in the batteries, as illustrated in FIG. 18.

The display screen illustrated in FIG. 18 further displays information 2051, 2052, and 2053 for identifying battery packs corresponding to battery identifiers. Each information 2051, 2052, and 2053 is a name for identifying individual battery packs in the home, represented as numbers such as "01" and "03".

The monitor 256 is configured as a touch panel, with battery images 2021, 21022, and 2023, representing the battery packs, being selectably displayed. When the finger 11 of the user touches one of the battery images 2021, 21022, and 2023, information relating to the battery pack corresponding to the touched battery image is displayed. In a case where the user selects a desired battery image, the display information illustrated in FIGS. 13 through 17 is displayed.

Figure 19:
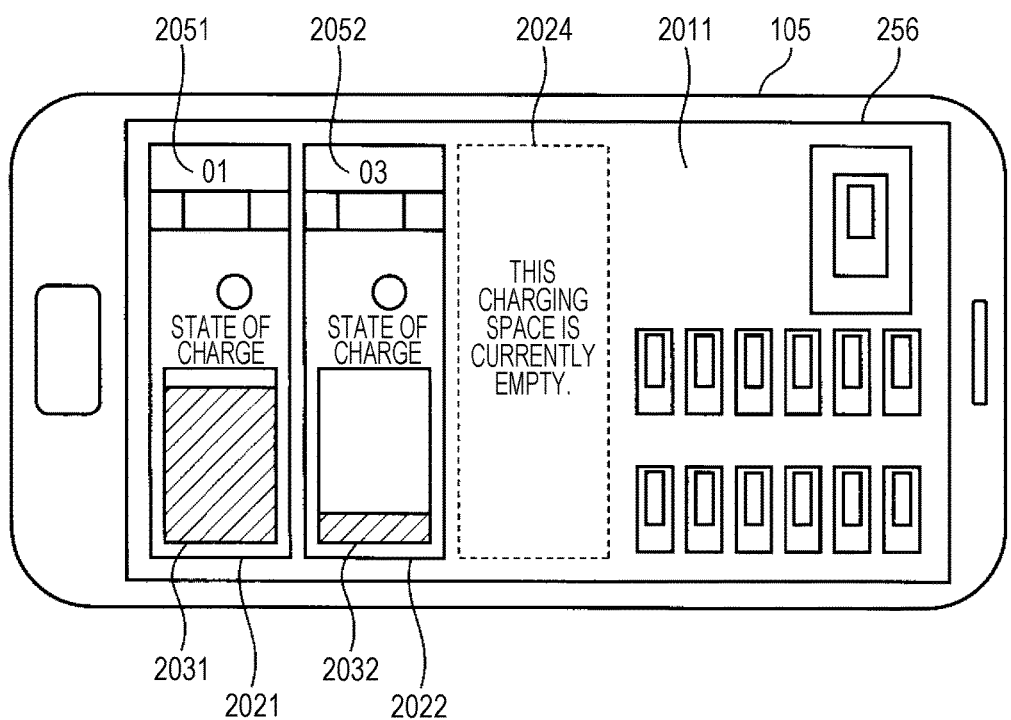
FIG. 19 is a diagram illustrating another example of display information displayed on the monitor of the display device in a case where a battery pack has been mounted to a distribution board, according to the second embodiment.

FIG. 19 is a diagram illustrating another example of display information displayed on the monitor of the display device in a case where a battery pack has been mounted to a distribution board, according to the present second embodiment. For example, the distribution board is provided with multiple charging spaces to mount battery packs. The distribution board not only functions as a back-up power source in a case of a power outage, but also serves as a charger to charge the battery packs with electric power. Accordingly, notifying how many battery packs can currently be mounted to the distribution board will further improve ease of use.

The display screen illustrated in FIG. 19 indicates that one of the three charging spaces provided to the distribution board 104 is empty. An image 2024 indicating a charging space where no battery pack is mounted is displayed.

Note that in the present second embodiment, the cloud server 111 may effect control so as to display battery packs currently not mounted to devices, or may effect control so as to display information relating to battery packs currently not mounted to devices.

Although multiple devices associated with the display device beforehand are displayed in the present second embodiment, and the mounted state of the battery packs to multiple devices displayed, the present disclosure is not restricted to this in particular. Information specifying devices for display of the mounted state of battery packs may be included in the display request transmitted from the display device to the cloud server, and the mounted state of battery packs as to the specified devices may be displayed along with display of the specified devices.

Also, although multiple devices associated with the display device beforehand are displayed in the present second embodiment, the present disclosure is not restricted to this in particular; user household IDs and multiple devices may be associated, with all devices associated with a user household ID being displayed. In this case, at the time of accepting, from a certain display device, a request to display the mounted state of the battery packs of the multiple devices which a certain household has, the cloud server 111 may acquire the battery identifiers of all battery packs mounted to each of all the devices which the certain household has, and the remaining charge of the batteries which each of the battery packs has. The cloud server 111 may then display the information for identifying the battery packs corresponding to the acquired battery identifiers and the remaining charge of the battery packs corresponding to the acquired battery identifiers together.

Also in the present second embodiment, upon the user making a request to display the mounted state of battery packs 103, a display request is transmitted to the cloud server 111, log information is read out from the storage unit 233 of the cloud server 111, and display information is generated, but this is not restrictive.

An arrangement may be made where the display request is transmitted to the battery pack 103 associated with the display device, with the display device 105 acquiring log information from the storage unit 217 of the battery pack 103 and acquiring display information. At this time, the display information is not generated at the cloud server 111, but within the display device 105. That is to say, the display device 105 has a display information generating unit having the same functions as the display information generating unit 406.

Also, although the life expectancy of the battery is estimated in the battery pack 103, the present disclosure is not restricted to this in particular; the cloud server 111 may acquire the charging/discharging cycle from the battery pack 103 and estimate the life expectancy using the acquired charging/discharging cycle. Also, although the usage period of the battery pack 103 is detected at the battery pack 103, the present disclosure is not restricted to this in particular; the cloud server 111 may acquire the date of starting usage from the battery pack 103 and calculate the usage period from the acquired date of starting usage.

Third Embodiment

Figure 20:
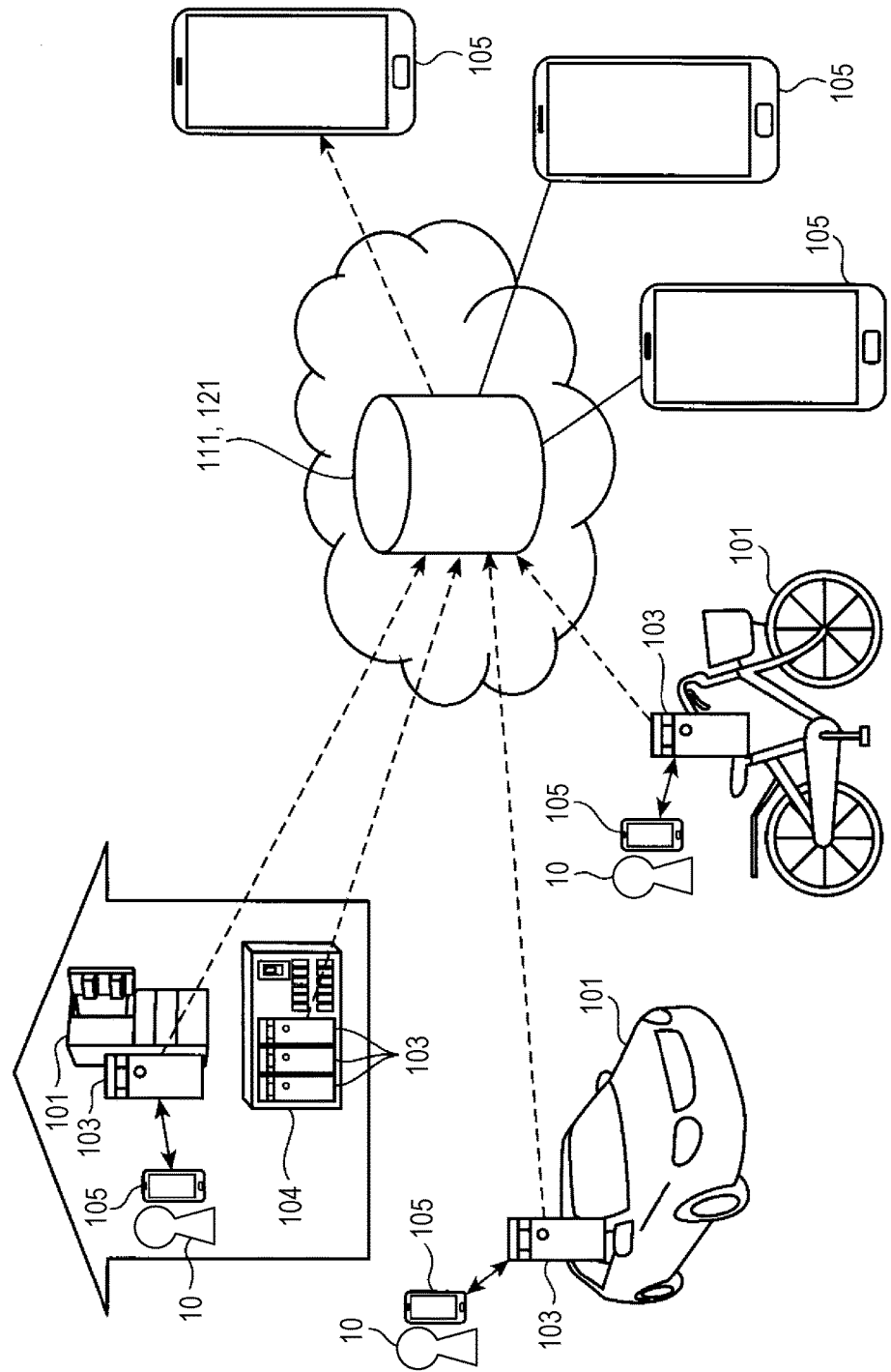
FIG. 20 is a diagram illustrating a schematic configuration of an information providing system according to a third embodiment of the present disclosure.

In a third embodiment, a user using a battery pack is identified. FIG. 20 is a diagram illustrating a schematic configuration of an information providing system according to a third embodiment of the present disclosure. Upon the user 10 mounting a battery pack 103 to a device 101, the battery pack 103 performs communication with the display device 105 which the user 10 has, and acquires a user individual ID for identifying the user 10 from the display device 105. The battery pack 103 then transmits log information including the user individual ID to the cloud server 111 (or server 121) situated on the network. Note that the same processing is performed in a case where a battery pack 103 is mounted to the distribution board 104, as with a case of a battery pack 103 being mounted to a device 101. The same processing may also be performed in a case where a battery pack 103 is detached from the distribution board 104, as with a case of a battery pack 103 being detached from a device 101.

Communication between the battery pack 103 and the display device 105 is performed by wireless communication such as, for example, Bluetooth (a registered trademark) or the like. The battery pack 103 and display device 105 are paired beforehand, and accordingly are connected by coming within a communicable distance of each other.

Note that the battery pack 103 and display device 105 may each also be provided with GPS, with the battery pack 103 connecting with the display device 105 closest in proximity. Accordingly, in a case where there are multiple display devices in a communicable distance with the battery pack 103, the display device which the user that has mounted the battery pack 103 to the device 101 can be identified.

When a battery pack 103 is mounted to one of multiple devices 101, the cloud server 111 (or server 121) acquires log information including a battery identifier for identifying the battery pack 103, a device identifier for identifying the device to which the battery pack 103 has been mounted, and the user individual ID. The cloud server 111 (or server 121) controls the display device 105 associated with the battery identifier, so as to display information indicating that the user corresponding to the acquired user individual ID has mounted the battery pack corresponding to the acquired battery identifier to the device corresponding to the acquired device identifier.

The display device 105 displays information indicating that the user corresponding to the acquired user individual ID has mounted the battery pack corresponding to the acquired battery identifier to the device corresponding to the acquired device identifier.

The cloud server 111 (or server 121) stores each of the battery identifier, the device identifier, and the user individual ID, acquired from the battery pack 103, as usage history in a correlated manner. In a case where the battery pack 103 is mounted to one of the multiple devices 101, the cloud server 111 (or server 121) compares the user individual ID included in the log information acquired from the battery pack 103, with a user individual ID stored as usage history correlated with the same battery identifier as the battery identifier included in log information acquired from the battery pack 103 at the same point-in-time as the point-in-time of having acquired the log information but on a different day from the day on which the log information was acquired. In a case where the user individual IDs differ, the cloud server 111 (or server 121) controls the display device 105 corresponding to the user individual ID stored as usage history to display that the battery pack corresponding to the battery identifier has been mounted to the device corresponding to the device identifier by the user corresponding to the user individual ID.

Note that the following control may be performed in a case where a battery pack 103 mounted to one of the multiple devices 101 is detached.

Specifically, in a case where the battery pack 103 is detached from, the user individual ID of the user who has performed the detaching is compared with a user individual ID stored as usage history correlated with the same battery identifier as the battery identifier included in log information acquired from the battery pack 103 at the same point-in-time as the point-in-time of the detaching having been performed but on a different day from the day on which the detaching was performed. In a case where the user individual IDs differ, the cloud server 111 (or server 121) controls the display device 105 corresponding to the user individual ID stored as usage history to display that the battery pack corresponding to the battery identifier has been detached from the device corresponding to the device identifier by the user corresponding to the user individual ID.

Also, in a case where a user mainly using a battery pack 103 is set out of multiple users using the battery pack 103 as a main user, and a user other than the main user mounts the battery pack 103 to a device 101, control may be effected to display information to this effect on the display device 105 of the main user. A specific example of control is as follows. The cloud server 111 (or server 121) stores the user individual ID of the main user as a main user ID. Now, in a case where the battery pack 103 is mounted, the cloud server 111 (or server 121) compares the user individual ID of the user who has performed this with the user individual ID of the main user, stored in the cloud server 111 (or server 121). In a case where the user individual IDs differ, the cloud server 111 (or server 121) controls the display device 105 corresponding to the user individual ID of the main user to display that the battery pack corresponding to the battery identifier has been mounted to the device corresponding to the device identifier by the user corresponding to the user individual ID.

Also, in a case where a user other than the main user detaches the battery pack 103 from a device 101, control may be effected to display information to this effect on the display device 105 of the main user. A specific example of control is as follows. The cloud server 111 (or server 121) stores the user individual ID of the main user as a main user ID. Now, in a case where the battery pack 103 is detached, the cloud server 111 (or server 121) compares the user individual ID of the user who has performed this with the user individual ID of the main user stored in the cloud server 111 (or server 121). In a case where the user individual IDs differ, the cloud server 111 (or server 121) controls the display device 105 corresponding to the user individual ID of the main user to display that the battery pack corresponding to the battery identifier has been detached from the device corresponding to the device identifier by the user corresponding to the user individual ID.

Figure 21:
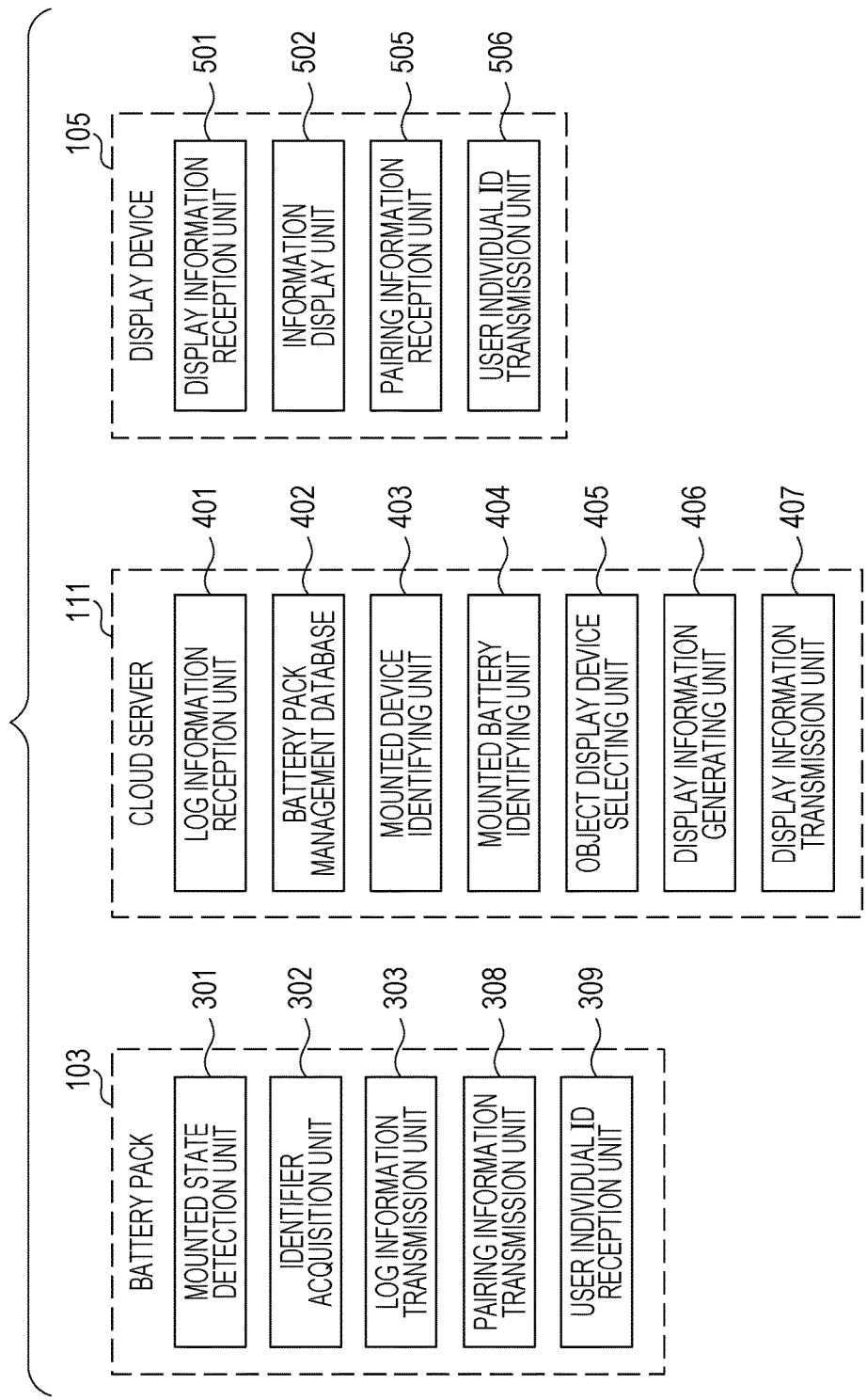
FIG. 21 is a functional block diagram illustrating the configuration of a battery pack, display device, and cloud server according to the third embodiment of the present disclosure.

FIG. 21 is a functional block diagram illustrating the configuration of a battery pack, display device, and cloud server according to the third embodiment of the present disclosure. Note that the hardware configuration of the information providing system according to the third embodiment is the same as the hardware configuration of the information providing system of the first embodiment illustrated in FIG. 3, so description will be omitted. Configurations in FIG. 21 which are the same as the battery pack, display device, and cloud server according to the modification of the first embodiment illustrated in FIG. 4 are denoted with the same reference numerals, and description thereof will be omitted.

The battery pack 103 includes the mounted state detection unit 301, identifier acquisition unit 302, log information transmission unit 303, and also a pairing information transmission unit 308 and a user individual ID reception unit 309. Note that the communication unit 216 illustrated in FIG. 3 includes the pairing information transmission unit 308 and the user individual ID reception unit 309.

Upon the mounted state detection unit 301 detecting that the battery pack 103 has been mounted to the device 101, the pairing information transmission unit 308 transmits pairing information to communicably communicate with a particular display device 105. Note that the pairing information is information generated in paring processing for the devices to authenticate each other. The battery pack 103 and the display device 105 stored the same pairing information.

The user individual ID reception unit 309 receives the user individual ID transmitted from the display device 105. The user individual ID is an identifier for identifying the user.

The log information transmission unit 303 transmits log information including the device identifier and battery identifier acquired by the identifier acquisition unit 302 and the user individual ID acquired by the user individual ID reception unit 309, to the cloud server 111.

The display device 105 includes the display information reception unit 501, information display unit 502, and also a pairing information reception unit 505 and a user individual ID transmission unit 506.

The pairing information reception unit 505 receives the paring information transmitted by the battery pack 103. In a case where the pairing information received by the pairing information reception unit 505 matches the pairing information stored beforehand, the user individual ID transmission unit 506 transmits the user individual ID to the battery pack 103. The user individual ID is stored in the memory 253 beforehand. Note that an identifier identifying the display device may be used instead of the user individual ID.

The cloud server 111 includes the log information reception unit 401, battery pack management database 402, mounted device identifying unit 403, mounted battery identifying unit 404, object display device selecting unit 405, display information generating unit 406, and display information transmission unit 407.

The battery pack management database 402 stores the device identifier, battery identifier, user individual ID, and date-and-time information, included in the log information received by the log information reception unit 401, as usage history for each user household (group).

FIG. 22 is a diagram illustrating an example of data stored in a battery pack management database according to the present third embodiment. As illustrated in FIG. 22, the battery pack management database 402 stores a user individual ID (user individual identifier), battery pack ID (battery identifier), device ID (device identifier), mounted state, and date-and-time information, correlated with a user household ID (user household identifier). For example, it can be understood that in a household corresponding to user household ID "0XX168", a battery pack corresponding to battery pack ID "1" has been mounted to a device corresponding to device ID "XX01", at 58 minutes past 10 o'clock on Dec. 17, 2013, by a user corresponding to user individual ID "A". Note that the user household ID (user household identifier) may be included in the received log information. The storage unit 233 may also store beforehand a table in which are correlated the battery pack ID (battery identifier) or device ID (device identifier) and the user household ID (user household identifier). The log information reception unit 401 may acquire the user household ID corresponding to the battery pack ID or device ID included in the received log information from the table, and store this in the battery pack management database 402.

Upon a battery pack being mounted to one of the multiple devices, the object display device selecting unit 405 identifies the user individual ID associated with the battery pack that has been mounted at generally the same point-in-time of a day different from the day where the battery pack was mounted, based on the usage history. Note that generally the same point-in-time may mean the same point-in-time, or may mean a point-in-time within around one hour before or after the same point-in-time. The object display device selecting unit 405 compares the acquired user individual ID with the identified user identifier. In a case where the acquired user individual ID and the identified user individual ID are different, the object display device selecting unit 405 selects a display device associated with the identified user individual ID. Note that the storage unit 233 stores a table correlating user individual IDs and display devices 105 beforehand. The object display device selecting unit 405 acquires a display device 105 corresponding to the identified user individual ID from the table.

On the other hand, in a case where the acquired user identifier and the identified user identifier are the same, the object display device selecting unit 405 selects a display device associated with the battery pack ID. Note that the storage unit 233 stores a table correlating battery pack IDs and display devices 105 beforehand. The object display device selecting unit 405 acquires a display device 105 corresponding to the battery pack ID included in the received log information from the table.

The display information generating unit 406 generates display information to be displayed on the display device 105, indicating that a battery pack corresponding to the acquired battery identifier has been mounted to a device corresponding to the acquired device identifier by a user corresponding to the acquired user individual ID.

Figure 23:
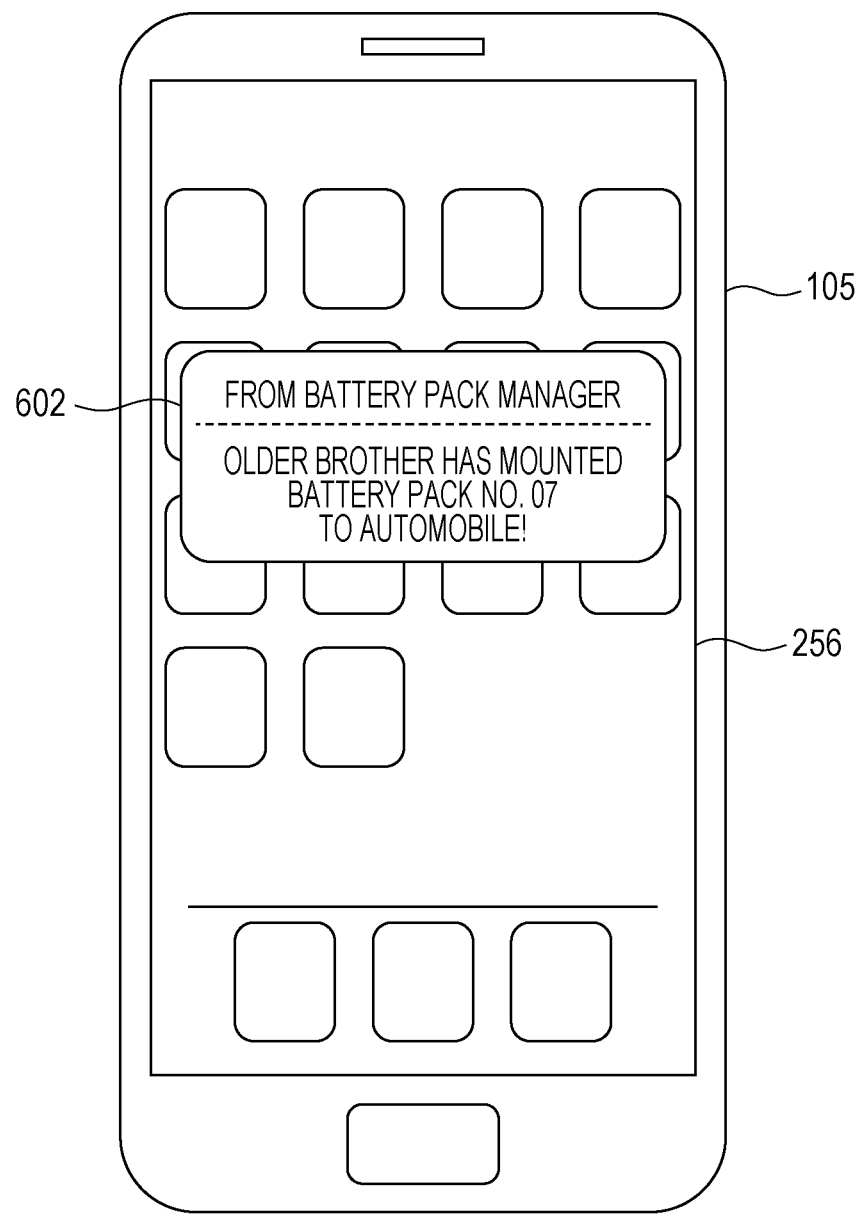
FIG. 23 is a diagram illustrating an example of display information displayed on a monitor of the display device in the third embodiment.

FIG. 23 is a diagram illustrating an example of display information displayed on a monitor of the display device in the present third embodiment. The mounted device identifying unit 403 identifies that the device 101 to which the battery pack 103 has been mounted is an automobile, based on the device identifier included in the log information. The mounted battery identifying unit 404 also identifies that the battery pack 103 mounted to the device 101 is battery pack No. 7, based on the battery identifier included in the log information.

When the battery pack is mounted to one of the multiple devices, the object display device selecting unit 405 also identifies the user individual ID associated with the battery pack mounted at generally the same point-in-time of a day different to the day that the battery pack was mounted, based on the usage history. Here the user who has mounted the battery pack (battery pack No. 7) to the device (automobile) is Older Brother, and the user how has mounted the battery pack (battery pack No. 7) to a device at the same point-in-time the day before, which is a day different from the day where the battery pack was mounted, is Father. In this case, the object display device selecting unit 405 select the display device associated with the identified user individual ID, because the acquired user individual ID (user individual ID of Older Brother) and the identified user individual ID (user individual ID of Father) are different. That is to say, the object display device selecting unit 405 selects the display device that Father has.

The display information generating unit 406 then generates display information saying "OLDER BROTHER HAS MOUNTED BATTERY PACK NO. 07 TO AUTOMOBILE!". The storage unit 233 at this time may store a name or nickname or the like to be displayed on the display device 105 correlated with the user individual ID beforehand, and the display information generating unit 406 may read the name or nickname corresponding to the user individual ID from the storage unit 233 and include in the display information.

The information display unit 502 of the display device 105 displays the display information 602 "OLDER BROTHER HAS MOUNTED BATTERY PACK NO. 07 TO AUTOMOBILE!" on the monitor 256.

Note that in the present third embodiment, the control unit 231 of the cloud server 111 may identify the user of the battery pack 103 and identify a timing at which to charge the battery pack 103, based on the usage history, and control the display device 105 associated with the identified user to display the timing at which to charge the battery pack 103.

That is to say, the control unit 231 of the cloud server 111 identifies the user using the battery pack. The control unit 231 then identifies a scheduled point-in-time at which the battery pack is to be mounted to a device after the current point-in-time, based on the point-in-time at which the battery pack was mounted to the device the previous day or earlier, for example, identifies a charging completion time for charging of the battery pack to be completed based on the current remaining charge in the battery pack, and decides a point-in-time obtained by subtracting the charging completion time from the identified scheduled point-in-time as the timing at which the battery pack should be charged. The control unit 231 of the cloud server 111 controls the display device associated with the identified user to display the timing at which to charge the battery pack. Accordingly, a user who routinely uses the battery pack can be notified regarding when the battery pack should be charged.

Fourth Embodiment

While a display device made up of a mobile terminal such as a smartphone or the like displays information indicating that a battery pack has been mounted to a device or distribution board in the first through third embodiments, in a fourth embodiment a display unit provided to the distribution board displays information indicating that a battery pack has been mounted to a device or distribution board.

Figure 24:
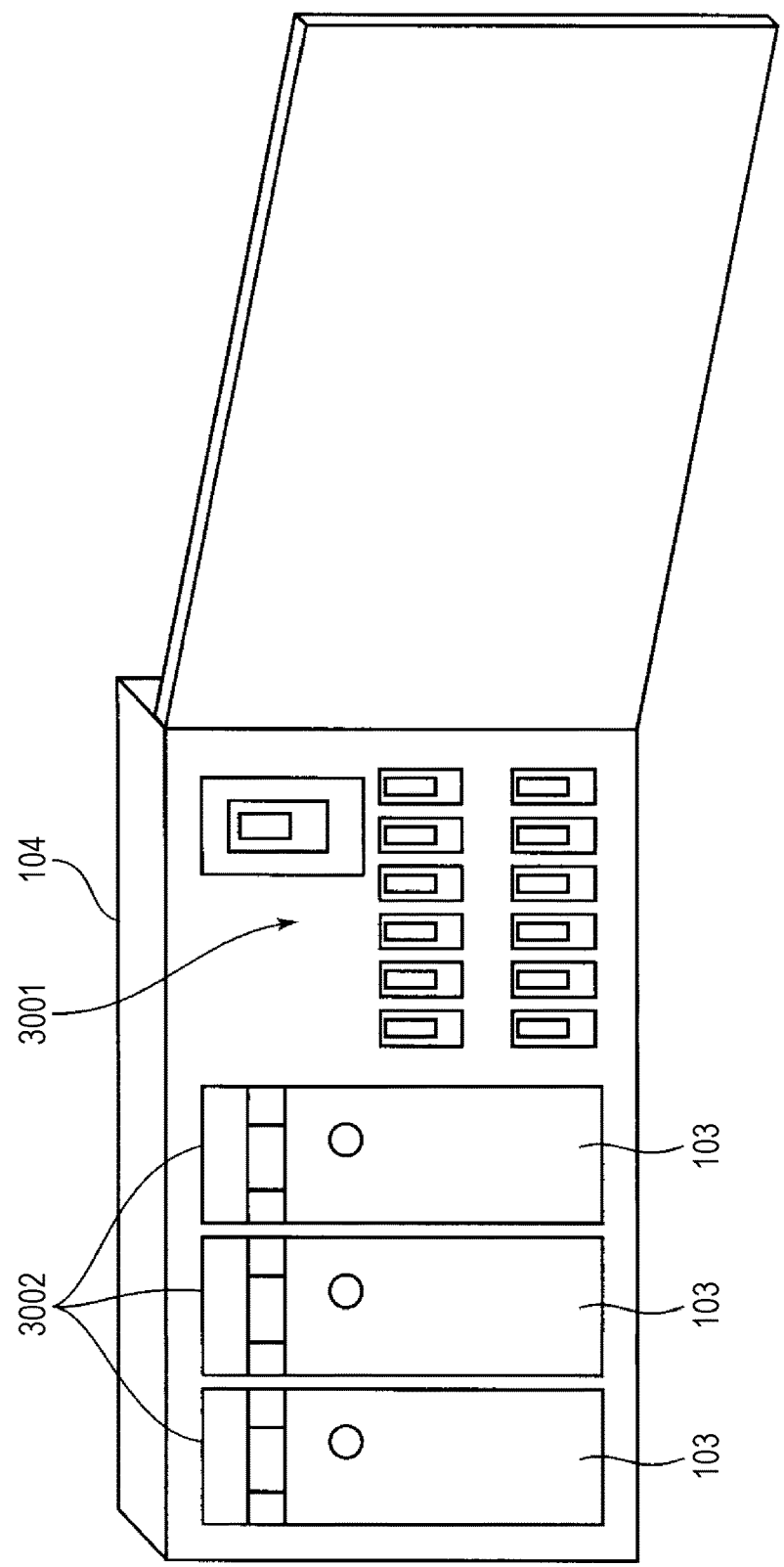
FIG. 24 is a diagram illustrating the external view of a distribution board in a state with a cover open, according to a fourth embodiment.
Figure 25:
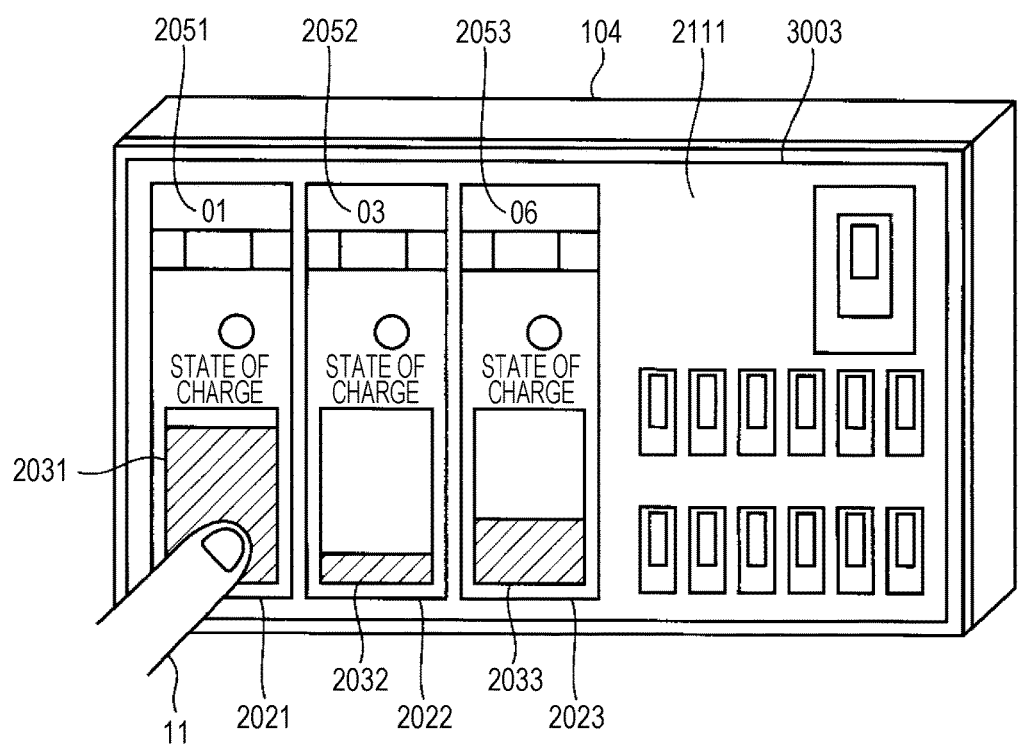
FIG. 25 is a diagram illustrating the external view of the distribution board in a state with a cover closed, according to the fourth embodiment.

FIG. 24 is a diagram illustrating the external view of a distribution board in a state with a cover open, according to the present fourth embodiment, and FIG. 25 is a diagram illustrating the external view of the distribution board in a state with a cover closed, according to the present fourth embodiment. The distribution board 104 includes multiple breakers 3001, multiple battery accommodation portions 3002, and a display unit 3003, as illustrated in FIGS. 24 and 25. The multiple battery accommodation portions 3002 each accommodate a battery pack 103 so as to be capable of charging and discharging. In the example in FIG. 24, the distribution board 104 has three battery accommodation portions 3002, with a battery pack 103 mounted to each battery accommodation portion 3002.

The display unit 3003 is disposed on the front face of the cover of the distribution board 104, and is configured as a liquid crystal touch panel, for example. The distribution board 104 includes the configuration of the display device 105 illustrated in FIG. 11.

When a battery pack 103 is mounted to the distribution board 104, display information illustrated in FIG. 25 is displayed on the display unit 3003. The display information illustrated in FIG. 25 is not restricted to be displayed only when a battery pack 103 is mounted to the distribution board 104, and may be displayed in a case where an instruction has been accepted to perform a display regarding the state of the distribution board 104. The display unit 3003 also displays display information such as illustrated in FIG. 12 when the battery pack 103 is mounted to the device 101.

Displayed in the display screen illustrated in FIG. 25 are a distribution board image 2111 representing the distribution board, battery images 2021, 2022, and 2023 indicating that battery packs are mounted, and state-of-charge images 2031, 2032, and 2033 indicating the state of charge of the battery packs. The display information generating unit 406 of the cloud server 111 generates display information including the state of charge of the battery packs. The states of charge are represented by bar graphs corresponding to the remaining charge in the batteries, as illustrated in FIG. 25.

The display screen illustrated in FIG. 25 further displays information 2051, 2052, and 2053 for identifying battery packs corresponding to battery identifiers. Each information 2051, 2052, and 2053 is a name for identifying multiple individual battery packs in the home, represented as numbers such as "01" and "03", for example.

The display unit 3003 is configured as a touch panel, with battery images 2021, 2022, and 2023, representing the battery packs, being selectably displayed. When the finger 11 of the user touches one of the battery images 2021, 2022, and 2023, information relating to the battery pack corresponding to the touched battery image is displayed. In a case where the user selects a desired battery image, the display information illustrated in FIG. 26 or FIG. 27 is displayed.

Figure 26:
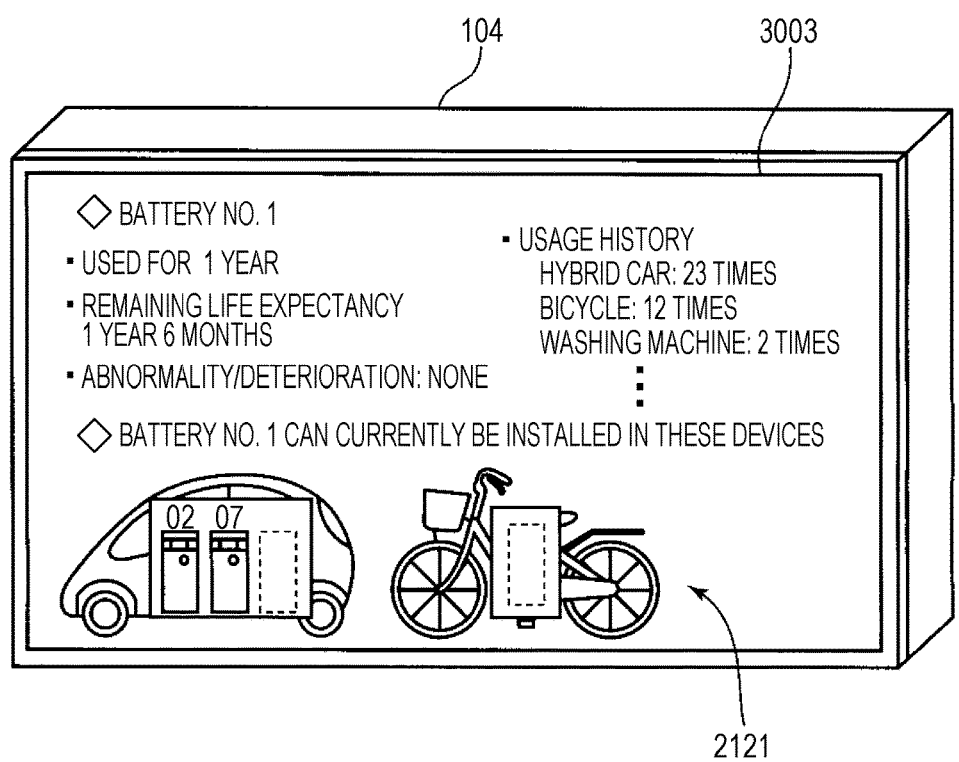
FIG. 26 is a diagram illustrating an example of display information including information relating to a battery pack selected by the user, and information of devices which can be operated in a case of mounting the current battery pack, according to the fourth embodiment.
Figure 27:
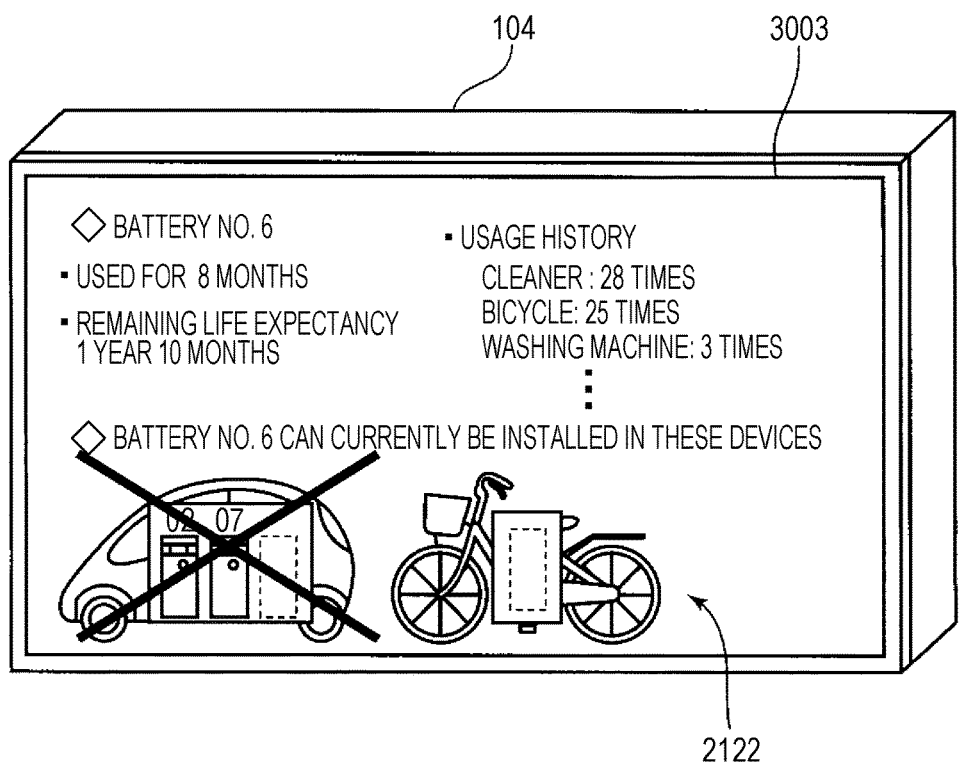
FIG. 27 is a diagram illustrating an example of display information including information relating to a battery pack selected by the user, information of a device which can be operated in a case of mounting the current battery pack, and information of a device which will not operate in a case of mounting the current battery pack, according to the fourth embodiment.

FIG. 26 is a diagram illustrating an example of display information including information relating to a battery pack selected by the user, and information of devices which can be operated in a case of mounting the current battery pack, according to the present fourth embodiment. FIG. 27 is a diagram illustrating an example of display information including information relating to a battery pack selected by the user, information of a device which can be operated in a case of mounting the current battery pack, and information of a device which will not operate in a case of mounting the current battery pack, according to the present fourth embodiment. The contents of the display information illustrated in FIG. 26 are the same as the contents of the display information illustrated in FIG. 15, and the contents of the display information illustrated in FIG. 27 are the same as the contents of the display information illustrated in FIG. 16, so description will be omitted.

Information indicating that battery packs 103 are mounted to devices 101 or the distribution board 104 is thus displayed on the display unit 3003 provided to the distribution board 104, so the user can confirm at the distribution board 104 the state of battery packs 103 being charged by the distribution board 104.

Note that the components in the above-described embodiments may be configured using dedicated hardware, or may be realized by executing software programs appropriate for the components. The components may be realized by a program executing unit such as a CPU or like processor reading out and executing a software program recorded in a recording medium such as a hard disk or semiconductor memory or the like.

Although description has been made based on embodiments regarding an information providing method and information providing system according to one or multiple embodiments, the present disclosure is not restricted to these embodiments. Forms configured by applying modifications conceivable by those skilled in the art to the embodiments, and combinations of components of different embodiments, may also be encompassed in the scope of one or multiple embodiments, as long as not departing from the essence of the present disclosure.

Service Types

The technology described above in all of the embodiments may be realized by the following types of cloud service. However, the type of cloud service by which the above technology described in the above embodiments can be realized is not restricted to these.

Service Type 1: In-House Data Center Type Cloud Service

Figure 28:
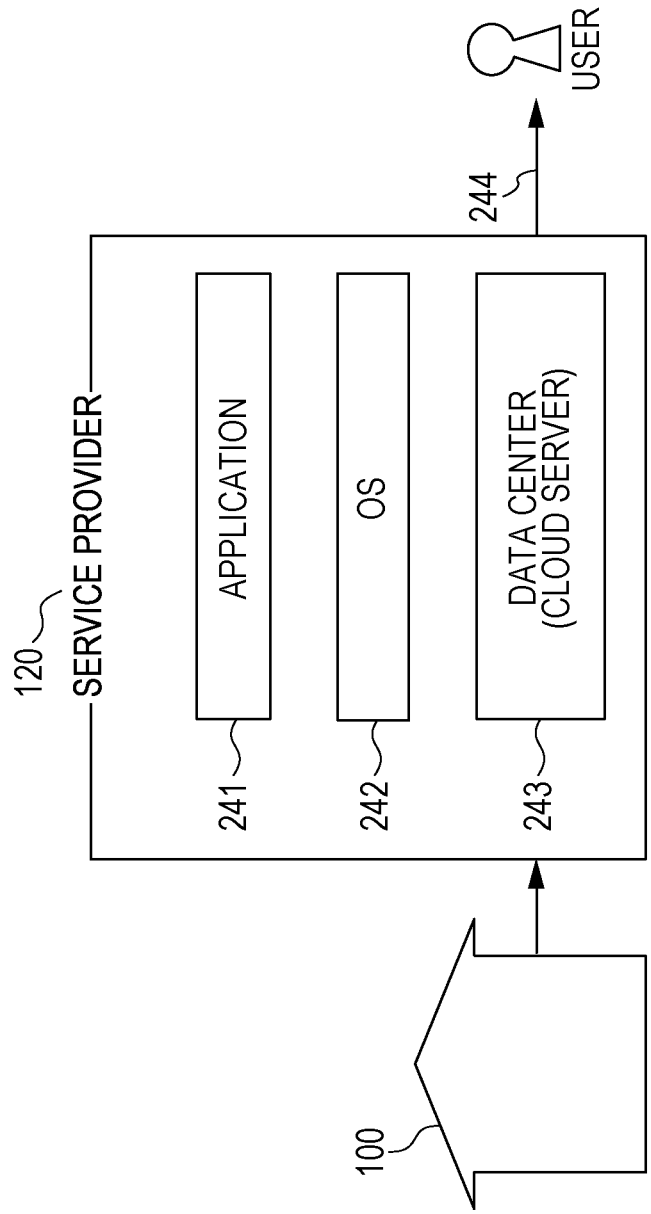
FIG. 28 is a diagram illustrating an overall image of service provided by an information providing system according to a type 1 service (in-house data center type cloud service)

FIG. 28 is a diagram illustrating the overall image of services which the information providing system provides in a service type 1 (in-house data center type cloud service). This type is a type where a service provider 120 obtains information from a group 100, and provides a user with service. In this type, the service provider 120 functions as a data center operator. That is to say, the service provider 120 has a cloud server 243 to manage big data. Accordingly, the data center operator does not exist.

In this type, the service provider 120 operates and manages the data center (cloud server) 243. The service provider 120 also manages operating system (OS) 242 and applications 241. The service provider 120 provides services (arrow 244) using the OS 242 and applications 241 managed by the service provider 120.

Service Type 2: IaaS Usage Type Cloud Service

Figure 29:
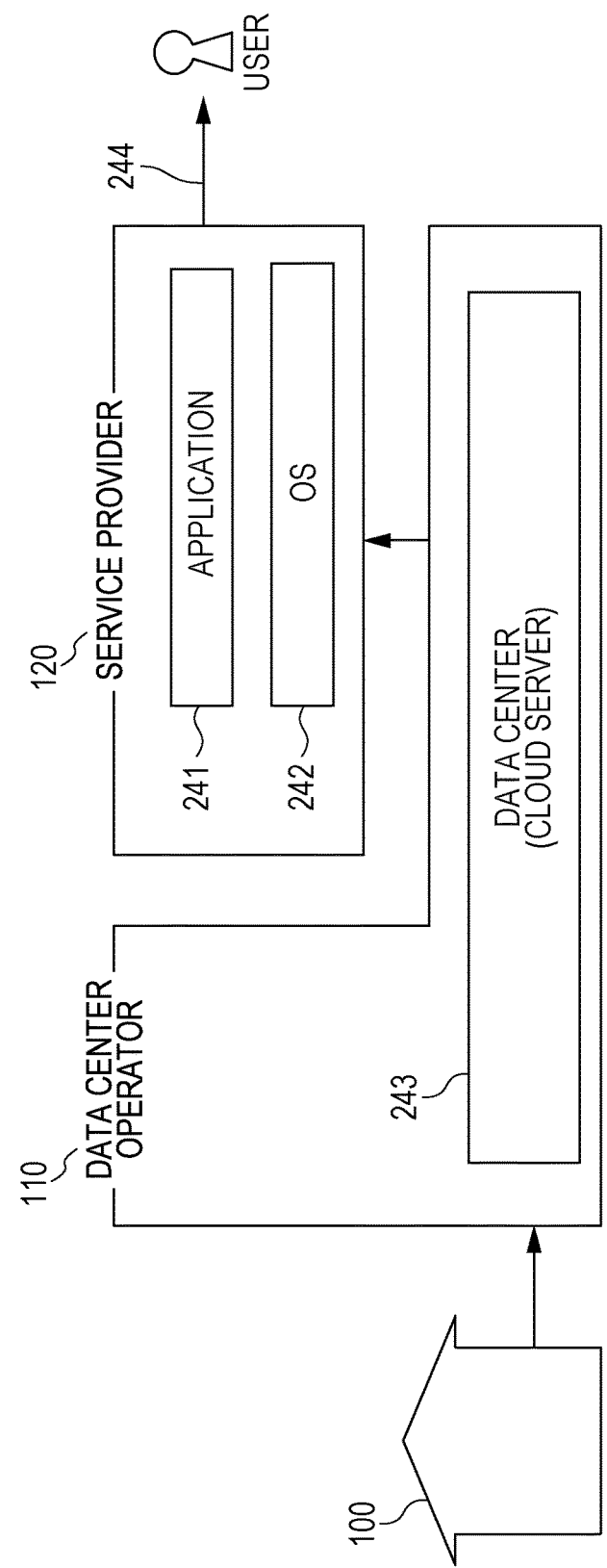
FIG. 29 is a diagram illustrating an overall image of service provided by an information providing system according to a type 2 service (IaaS usage type cloud service)

FIG. 29 is a diagram illustrating the overall image of services which the information providing system provides in a service type 2 (IaaS usage type cloud service). IaaS stands for "Infrastructure as a Service", and is a cloud service providing model where the base for computer system architecture and operation itself is provided as an Internet-based service.

In this type, the data center operator 110 operates and manages the data center 243 (cloud server). The service provider 120 manages the OS 242 and applications 241. The service provider 120 provides services (Arrow 244) using the OS 242 and applications 241 managed by the service provider 120.

Service Type 3: PaaS Usage Type Cloud Service

Figure 30:
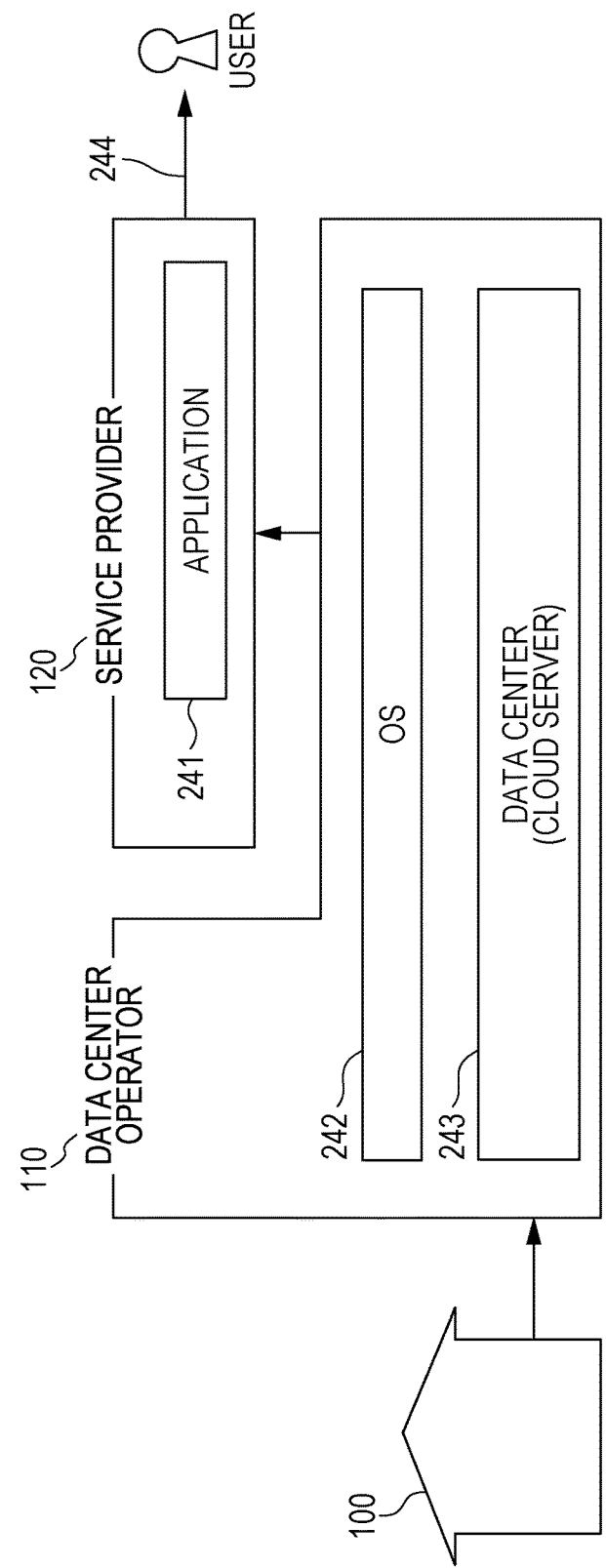
FIG. 30 is a diagram illustrating an overall image of service provided by an information providing system according to a type 3 service (PaaS usage type cloud service)

FIG. 30 is a diagram illustrating the overall image of services which the information providing system provides in a service type 3 (PaaS usage type cloud service). PaaS stands for "Platform as a Service", and is a cloud service providing model where a platform serving as the foundation for software architecture and operation is provided as an Internet-based service.

In this type, the data center operator 110 manages the OS 242 and operates and manages the data center 243 (cloud server). The service provider 120 also manages the applications 241. The service provider 120 provides services (arrow 244) using the OS 242 managed by the data center operator 110 and applications 241 managed by the service provider 120.

Service Type 4: SaaS Usage Type Cloud Service

Figure 31:
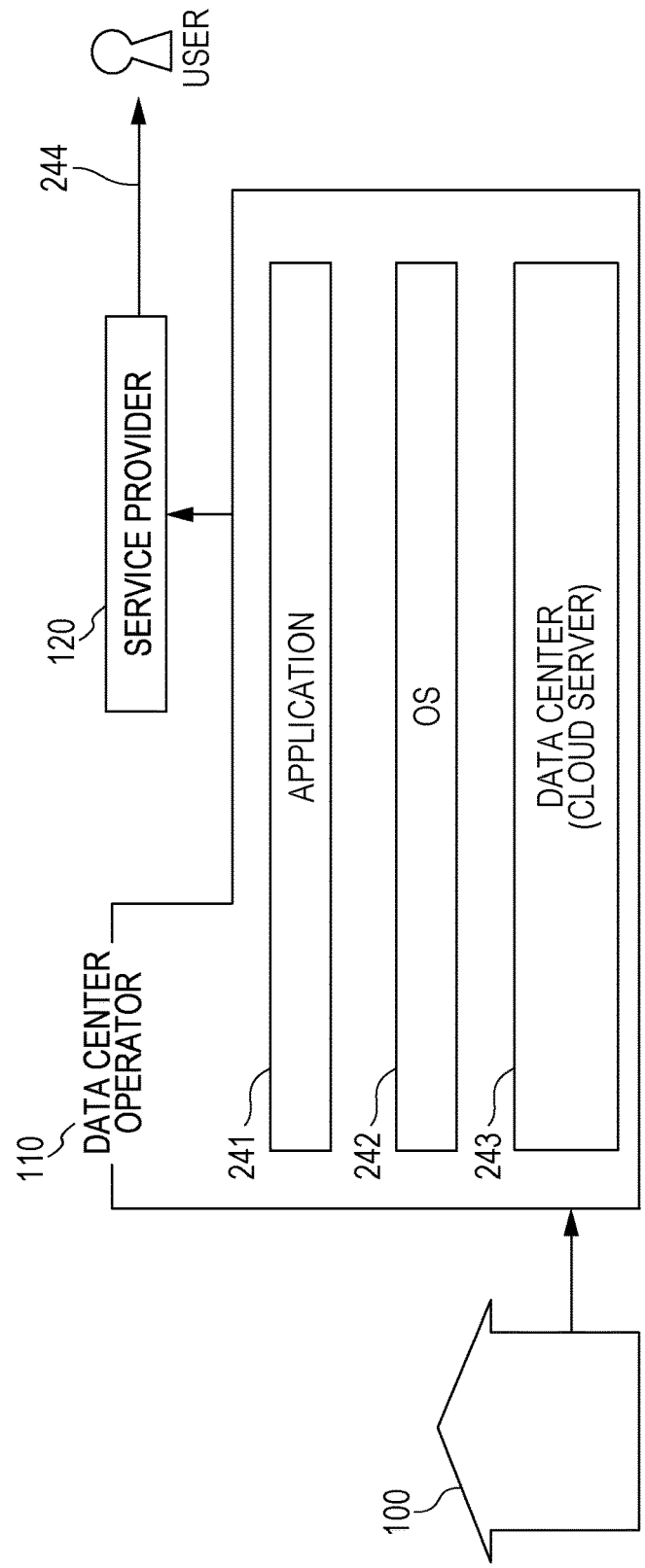
FIG. 31 is a diagram illustrating an overall image of service provided by an information providing system according to a type 4 service (SaaS usage type cloud service).

FIG. 31 is a diagram illustrating the overall image of services which the information providing system provides in a service type 4 (SaaS usage type cloud service). SaaS stands for "Software as a Service". A SaaS usage type cloud service is a cloud service providing model having functions where corporations or individuals who do not have a data center (cloud server) can use applications provided by a platform provider having a data center (cloud server) for example, over a network such as the Internet.

In this type, the data center operator 110 manages the applications 241, manages the OS 242, and operates and manages the data center 243 (cloud server). The service provider 120 provides services (arrow 244) using the OS 242 and applications 241 managed by the data center operator 110.

In each of these types, the service provider 120 performs the act of providing services. The service provider or data center operator may develop the OS, applications, database for big data, and so forth, in-house, or may commission this to a third party, for example.

The information providing method and information providing device according to the present disclosure enables the user to comprehend devices to which battery packs are mounted, and are useful as an information providing method and information providing device which provide information to a display device based on the mounted state of battery packs which can be mounted to multiple devices.

The battery pack according to the present disclosure can notify to the user which of multiple battery packs have been mounted to which of multiple devices, and is useful as a battery pack which can be mounted to multiple devices.

What is claimed is:

1. An information displaying method using a server comprising a receiver and a controller, comprising:
   storing, in a memory, a plurality of battery identifiers and a plurality of displays in association with each other;
   receiving, by a receiver, a battery identifier identifying a battery pack, and a device identifier identifying a device to which the battery pack has been mounted, the battery pack being connectable to a plurality of devices of different types;
   receiving, by the receiver, information indicating remaining charge in the battery pack mounted on the device;
   selecting a display from the plurality of displays based on the received battery identifier, the selected display being associated with the received battery identifier in the memory;
   causing, by the controller, a monitor of the selected display to display information indicating that the battery pack corresponding to the received battery identifier has been mounted to the device corresponding to the received device identifier;
   causing, by the controller, the monitor of the selected display to display the information indicating remaining charge in the battery pack;
   receiving, via the display, information input by a user; and
   outputting, by the controller, a control command changing a power supply mode of the battery pack based on the information input by the user, the control command causing the battery pack to change an output power of the battery pack.

2. The information displaying method according to claim 1, wherein
   the battery identifier and the device identifier are received upon the battery pack being mounted to the device.

3. The information displaying method according to claim 1, wherein the battery identifier and the device identifier are received in response to accepting a request to display a mounted state of the battery pack.

4. The information displaying method according to claim 1, wherein a second image indicating a mounted state of the battery pack is displayed in a perimeter of a first image indicating the device to which the battery pack has been mounted.

5. The information displaying method according to claim 1, wherein a second image indicating a mounted state of the battery pack is superimposed on a first image indicating the device to which the battery pack has been mounted.

6. The information displaying method according to claim 1, further comprising:
   receiving, by the receiver, when the display accepts an input operation from a user to cause the monitor to display a mounted state of a battery pack to a first device of the plurality of devices, information relating to a number of battery packs mountable to the first device and the mounted state of the battery pack; and
   causing, by the controller, the monitor to display, based on the received information relating to the number of battery packs mountable to the first device and the mounted state of the battery pack, the number of battery packs mountable to the first device, and to display a state in which the battery pack is mounted and a state in which the battery pack is not mounted in mutually different display forms.

7. The information displaying method according to claim 6, wherein battery identifiers of all battery packs mounted to the first device and the information indicating remaining charge in each of the battery packs are received, and information to identify the battery packs corresponding to the received battery identifiers and the information indicating remaining charge in each of the battery packs corresponding to the received battery identifiers are displayed together.

8. The information displaying method according to claim 1, further comprising:

receiving, by the receiver, when the display accepts an input operation from a user to cause the monitor to display mounted states of battery packs to a plurality of devices which a household has, information relating to a number of battery packs mountable to all devices which the household has and the mounted state of each battery pack; and causing, by the controller, the monitor of the display to display, based on the received information relating to the number of battery packs mountable to all devices which the household has and the mounted state of each battery pack, the number of battery packs mountable to all devices which the household has, and also to display a state in which the battery pack is mounted and a state in which the battery pack is not mounted in mutually different display forms.

9. The information displaying method according to claim 8, wherein battery identifiers of all battery packs mounted to each of all devices which the household has and the information indicating remaining charge in each of the battery packs are received, and information to identify the battery packs corresponding to the received battery identifiers and the information indicating remaining charge in each of the battery packs corresponding to the received battery identifiers are displayed together.

10. The information displaying method according to claim 1, further comprising:

receiving, by the receiver, upon the battery pack being mounted to the device, a battery identifier identifying the battery pack, a device identifier identifying the device to which the battery pack has been mounted, a user identifier identifying a user that has mounted the battery pack, and date-and-time information indicating date and time that the battery pack was mounted;

storing, in the memory, the battery identifier, the device identifier, the user identifier, and the date-and-time information, that have been received, as usage history;

identifying, upon the battery pack being mounted to the device, a user identifier associated with the battery pack mounted at generally the same point-in-time of a day different from the day where the battery pack was mounted, based on the usage history; and causing, by the controller, a monitor of a display associated with the battery identifier of the battery pack in the memory, to display, in a case where the received user identifier and the identified user identifier are different, information indicating that the battery pack corresponding to the received battery identifier has been mounted to the device corresponding to the received device identifier.

11. The information displaying method according to claim 1, further comprising:

receiving, by the receiver, upon the battery pack being mounted to the device, a battery identifier to identify the battery pack, a device identifier to identify the device to which the battery pack has been mounted, a user identifier to identify a user that has mounted the battery pack, and date-and-time information indicating date and time that the battery pack was mounted;

storing, in the memory, the battery identifier, the device identifier, the user identifier, and the date-and-time information, that have been received, as usage history;

identifying the user using the battery pack, and identifying a timing to charge the battery pack, based on the usage history; and causing, by the controller, a monitor of a display associated with the battery identifier of the battery pack in the memory, to display the timing to charge the battery pack.

12. The information displaying method according to claim 1, further comprising:

storing, in the memory, a table, in which the battery pack, at least one device to which the battery pack is mounted, and a user of the battery pack are associated with each other beforehand;

referencing the table, upon the battery pack being mounted, by a first user, to one device of the plurality of devices, and determining whether or not the one device to which the battery pack has been mounted is associated with the first user in the table; and when it is determined that the one device to which the battery pack has been mounted is not associated with the first user of the battery pack in the table, causing the monitor of the display, which is associated with the battery identifier of the battery pack in the memory, to display, information that the battery pack has not been mounted to a device that is associated with the battery pack beforehand.

13. The information displaying method according to claim 1, further comprising:

receiving, by the receiver, position information indicating a current position of the battery pack; and causing, by the controller, the monitor of the selected display to display the received position information.

14. A server for displaying information comprising:

a memory that stores a plurality of battery identifiers and a plurality of displays in association with each other;

a receiver that receives, a battery identifier identifying a battery pack and a device identifier identifying a device to which the battery pack has been mounted, the battery pack being connectable to a plurality of devices of different types;

a first controller that selects a display from the plurality of displays based on the received battery identifier, the selected display being associated with the received battery identifier in the memory; and a second controller that causes a monitor of the selected display to display information indicating that the battery pack corresponding to the received battery identifier has been mounted to the device corresponding to the received device identifier.

15. The information displaying method according to claim 1, further comprising causing, by the controller, the selected display to display information indicating that the device is operable with the battery pack, or information indicating that the device is not operable with the battery pack.

* * * * *